United States Patent
Bhowmik et al.

(10) Patent No.: US 12,477,372 B2
(45) Date of Patent: Nov. 18, 2025

(54) METHOD AND USER EQUIPMENT FOR PREVENTING CALL DROP IN A WIRELESS NETWORK

(71) Applicant: Samsung Electronics Co., Ltd., Suwon-si (KR)

(72) Inventors: Samiran Bhowmik, Bangalore (IN); Alok Kumar Jangid, Bangalore (IN); Aman Agarwal, Bangalore (IN); Kailash Kumar Jha, Bangalore (IN); Mohammad Umair, Bangalore (IN); Nitesh Pushpak Shah, Bangalore (IN); Ravi Pandappa Kamaladinni, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 18/076,854

(22) Filed: Dec. 7, 2022

(65) Prior Publication Data

US 2023/0118064 A1 Apr. 20, 2023

Related U.S. Application Data

(63) Continuation of application No. PCT/KR2021/010805, filed on Aug. 13, 2021.

(30) Foreign Application Priority Data

Aug. 15, 2020 (IN) .............................. 202041035245
Aug. 5, 2021 (IN) .............................. 2020 41035245

(51) Int. Cl.
*H04W 24/04* (2009.01)
*H04W 24/10* (2009.01)
*H04W 36/00* (2009.01)

(52) U.S. Cl.
CPC ........... *H04W 24/10* (2013.01); *H04W 24/04* (2013.01); *H04W 36/00226* (2023.05)

(58) Field of Classification Search
CPC ................. H04W 24/10; H04W 24/04; H04W 36/00226; H04W 88/06
See application file for complete search history.

(56) References Cited

U.S. PATENT DOCUMENTS 10,499,287 B1 12/2019 Sharma et al.
2020/0053616 A1 2/2020 Zhu et al.
(Continued)

FOREIGN PATENT DOCUMENTS

CN 104919741 A * 9/2015 ........... H04L 1/1874
CN 111405620 A 7/2020
(Continued)

OTHER PUBLICATIONS

3GPP; 3rd Generation Partnership Project; Technical Specification Group Services and System Aspects; Study on security aspects of single radio voice continuity from 5G to UTRAN (Release 16); 3GPP TR 33.856; V16.1.0; Jun. 13, 2019; Valbonne, France.
(Continued)

*Primary Examiner* — Chuong A Ngo
(74) *Attorney, Agent, or Firm* — Jefferson IP Law, LLP

(57) ABSTRACT

A method of handling an ongoing call performed by a UE in a wireless network is provided. The method includes initiating a voice over long term evolution call in a 4G network, detecting that a 5G network entity has configured an inter radio access technology measurement indicating a change from the 4G network to a 5G network based on identification of the 5G network, determining whether at least one of the UE or the 5G network does not support a voice over new radio (VoNR) call with a 5G cell, in response to determining that the at least one of the UE or the 5G network does not (Continued)

support the VoNR call, delaying sending a measurement report until the VOLTE call is completed, and in response to determining that both the UE and the 5G network support the VoNR call, sending the measurement report immediately for the 5G cell.

20 Claims, 16 Drawing Sheets

(56) References Cited

U.S. PATENT DOCUMENTS

| | | | |
|---|---|---|---|
| 2020/0100309 A1 | 3/2020 | Jha et al. | |
| 2020/0112892 A1 | 4/2020 | Shi et al. | |
| 2020/0383010 A1* | 12/2020 | Zhu | H04W 36/00226 |

FOREIGN PATENT DOCUMENTS

| | | | |
|---|---|---|---|
| CN | 111885658 A * | 11/2020 | ........ H04W 36/0055 |
| WO | 2016/195944 A1 | 12/2016 | |
| WO | 2019/085831 A1 | 5/2019 | |
| WO | 2019/245305 A1 | 12/2019 | |
| WO | 2020/146216 A1 | 7/2020 | |

OTHER PUBLICATIONS

Ericsson; Use of EPS/RAT fallback for VoWiFi session; 3GPP TSG-SA2 Meeting #136AH; S2-200338 (revision of S2-20-0XXX); Jan. 7, 2020; Incheon, Korea.

International Search Report with Written Opinion dated Nov. 10, 2021; International Appln. No. PCT/KR2021/010805.

Indian office Action dated Oct. 9, 2025, issued in Indian Patent Application No. 202041035245.

* cited by examiner

METHOD AND USER EQUIPMENT FOR PREVENTING CALL DROP IN A WIRELESS NETWORK

CROSS-REFERENCE TO RELATED APPLICATION(S)

This application is a continuation application, claiming priority under § 365(c), of an International application No. PCT/KR2021/010805, filed on Aug. 13, 2021, which is based on and claims the benefit of an Indian Provisional patent application number 202041035245, filed on Aug. 15, 2020, in the Indian Intellectual Property Office, and of an Indian Complete patent application No. 202041035245, filed on Aug. 5, 2021, in the Indian Intellectual Property Office, the disclosure of each of which is incorporated by reference herein in its entirety.

BACKGROUND

1. Field

The disclosure relates to wireless network communication. More particularly, the disclosure relates to a method and a user equipment (UE) for handling an ongoing call in a wireless network by preventing call drop.

2. Description of Related Art

For a 5th generation (5G) user equipment (UE) operating in stand alone (SA) or long term evolution (LTE) mode/ non-stand alone (NSA) modes, during initial 5G deployment, voice services are availed either using evolved packet system fall-back (EPS FB), if the UE is in the 5G SA mode or using voice over LTE (VOLTE) call in LTE/NSA mode when internet protocol (IP) multimedia sub system (IMS) voice over packet switched (PS) session is supported in LTE.

When the 5G UE (5G SA capable) moves from an LTE location to a 5G SA location, a handover to 5G core network (CN) is triggered (evolved packet code (EPC)→next generation core (NGC)). When the 5G UE has an active VOLTE call during handover to 5G CN (EPC→NGC), the call is dropped if a voice over new radio (VoNR) is not supported by the UE or by a network.

In urban areas where LTE and 5G SA systems co-exist, the handovers from 4th generation (4G) (EPC) to 5G SA is more often. There is a high impact on voice services availed to 5G mobile subscribers if the VoNR is not supported by the UE or the network. In a 4G and 5G SA overlapped areas, the 5G UE users are more prone to experience mobile originated/mobile terminated (MO/MT) call setup failures and call drops due to handover from LTE to 5G SA system if the VoNR is not supported by the UE or network.

In the related arts, there is no pre-define handling of the network in order to avoid handover to a new radio (NR) cell not supporting VoNR or the UE not supporting the VoNR during a VOLTE Call on 4G because of which call drop can happen.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect the disclosure is to provide a method and a user equipment (UE) for prevent call drop when voice over new radio (VoNR) is not supported.

Another aspect of the disclosure is to provide a method and UE for avoiding handovers from a 4th generation (4G) network to a 5th generation (5G) network when VoNR is not supported.

Additional aspects will be set forth in part in the description which follows and, in part, will be apparent from the description, or may be learned by practice of the presented embodiments.

In accordance with an aspect of the disclosure, a method for handling an ongoing call performed by a UE in a wireless network is provided. The method includes initiating, by the UE, a voice over long term evolution (VOLTE) call, detecting, by the UE, that a 5G network entity has configured an inter radio access technology (I-RAT) measurement indicating a change from the 4G network to a 5G network based on identification of the 5G network by the UE, determining, by the UE, whether at least one of the UE or the 5G network supports a VoNR call with a 5G cell in the 5G network, and performing, by the UE one of delaying sending a measurement report (MR) until the VOLTE call is completed in response to determining that the at least one of the UE or the 5G network does not support the VoNR call, and sending the MR immediately for the 5G cell in response to determining that both the UE does and the 5G network support the VoNR call.

In an embodiment, a measurement report associated with a B1 measurement report event and a B2 measurement report event are delayed in response to determining that the at least one of the UE or the 5G network does not support the VONR call In an embodiment, the delaying the sending of the measurement report includes determining that the UE does not support evolved universal mobile telecommunications system (UMTS) terrestrial radio access (E-UTRA) new radio dual connectivity (ENDC) over long term evolution (LTE) mode and a 5G stand alone (SA) mode, delaying, by the UE, sending of new radio (NR) measurement report (MR) associated with the B1 measurement report event and the B2 measurement report event to the 5G network entity, determining, by the UE, whether the ongoing VOLTE call is disconnected, and performing, by the UE one of sending the NR measurement Reports associated with the B1 measurement report event and the B2 measurement report event to the 5G network entity in response to determining that the VOLTE call is disconnected, or continue delaying the sending of the NR measurement report associated with the B1 measurement report event and the B2 measurement report event to the 5G network entity in response to determining that the VOLTE call is ongoing.

In an embodiment, the delaying the sending of the measurement report includes determining that the UE does not support ENDC over LTE mode and 5G SA mode, sending, by the UE, the NR Measurement Report associated with a B1 measurement report event and a B2 measurement report event to the 5G network entity, receiving, by the UE, from the 5G network entity, an LTE to NR handover message, and continuing the VOLTE call in response to receiving the LTE to NR handover message.

In another embodiment, the delaying the sending of the Measurement Report includes determining that the UE supports ENDC over LTE mode and does not support VONR in a 5G SA mode, determining, by the UE, the a second cell group (SCG) associated with the 5G network is added, sending, by the UE, a NR measurement report for a A2/A3/A5 event and delaying the measurement report associated with a B1 measurement report event and a B2 measurement report event to the 5G network, determining, by the UE, whether the VOLTE call is disconnected, and performing, by the UE one of sending the Measurement Reports associated with the B1 measurement report event and B2 measurement report event to the 5G network entity in response to determining that the VOLTE call is disconnected, or continue delaying the sending of the measurement report associated with the B1 measurement report event and B2 measurement report event to the 5G network entity in response to determining that the VOLTE call is ongoing.

In another embodiment, the delaying the sending of the measurement report includes determining that the UE support ENDC over LTE mode and does not support VoNR in a 5G SA mode, determining, by the UE, whether a SCG associated with the 5G network is not added, sending, by the UE, the Measurement Report associated with a B1 measurement report event and a B2 measurement report event to the 5G network entity, receiving, by the UE, from the 5G network entity, an LTE to NR handover message, and continuing the VOLTE call in response to receiving the LTE to NR handover message.

In yet another embodiment, the delaying the sending of the measurement report includes determining that the UE support ENDC over LTE mode over LTE mode and does not support VONR in a 5G SA mode, determining, by the UE, whether a SCG associated with the 5G network is not added, delaying, by the UE, sending of the measurement report associated with a B1 measurement report event and a B2 measurement report event to the 5G network entity, determining, by the UE, whether the ongoing VOLTE call is disconnected, and performing, by the UE one of sending the Measurement Reports associated with the B1 measurement report event and the B2 measurement report event to the 5G network entity in response to determining that the VOLTE call is disconnected, or continue the delaying the sending of the measurement report associated with the B1 measurement report event and the B2 measurement report event to the 5G network entity in response to determining that the VOLTE call is ongoing.

In yet another embodiment, the delaying the sending of the measurement report includes determining that the UE support ENDC over LTE mode and does not support VONR in a 5G SA mode, determining, by the UE, a SCG associated with the 5G network is not added, sending, by the UE, the Measurement Report associated with a B1 measurement report event and a B2 measurement report event to the 5G network entity, receiving, by the UE, from the 5G network entity, an LTE to NR handover message, and continuing the VOLTE call in response to receiving the LTE to NR handover message.

In yet another embodiment, the delaying the sending of the Measurement Report includes determining that the UE support ENDC over LTE mode and does not support VONR over frequency range 2 (FR2), delaying, by the UE, sending of the measurement report associated with a B1 measurement report event and a B2 measurement report event to the 5G network entity, determining, by the UE, whether the ongoing VOLTE call is disconnected, and performing, by the UE one of sending the Measurement Reports associated with the B1 measurement report event and the B2 measurement report event to the 5G network entity in response to determining that the VOLTE call is disconnected, or continue the delaying the sending the measurement report associated with the B1 measurement report event and the B2 measurement report event to the 5G network entity in response to determining that the VOLTE call is ongoing.

In another embodiment, the delaying the sending of the measurement report includes determining that the UE support ENDC over LTE mode and does not support VONR over FR2, sending, by the UE, the Measurement Report associated with a B1 measurement report event and a B2 measurement report event to the 5G network entity, receiving, by the UE, from the 5G network entity, an LTE to NR handover message, and continuing the VOLTE call in response to receiving the LTE to NR handover message.

In yet another embodiment, the delaying the sending of the measurement report includes determining, that the UE supports a VoNR call, creating, by the UE, a database comprising a list of 5G cells supporting VoNR, receiving, by the UE, an I-RAT measurement indicating a change from the 4G network to a 5G network on identification of the 5G network by the UE, determining, by the UE, whether a 5G cell indicated in the I-RAT measurements is available in the database, and performing, by the UE one of performing handover of the ongoing VOLTE call from the 4G network to the 5G network in response to determining that the 5G cell is available in the database, or delaying sending of the Measurement Report associated with a B1 measurement report event and a B2 measurement report event to the 5G network entity in response to determining that 5G cell is not available in the database.

In an embodiment the change from the 4G network to the 5G network is due to a movement of the UE from a 4G network area to a 5G SA network area.

In accordance with another aspect of the disclosure, a UE for handling an ongoing call a wireless network is provided. The UE includes a memory, a processor, a communicator and wherein the processor is configured to initiate a voice over long term evolution (VOLTE) call in a 4G network, detect that a 5G network entity has configured an I-RAT measurement indicating a change from the 4G network to a 5G network based on identification of the 5G network by the UE, determine whether at least one of the UE and the 5G network supports a VoNR call with a 5G cell in the 5G network, perform one of delaying sending a MR associated with a B1 measurement report event and a B2 measurement report event until the VOLTE call is completed in response to determining that the at least one of the UE does or the 5G network does not support the VoNR call, and send the MR associated with a B1 measurement report event and a B2 measurement report event immediately for the 5G cell in response to determining that both the UE does and the 5G network support the VoNR call.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
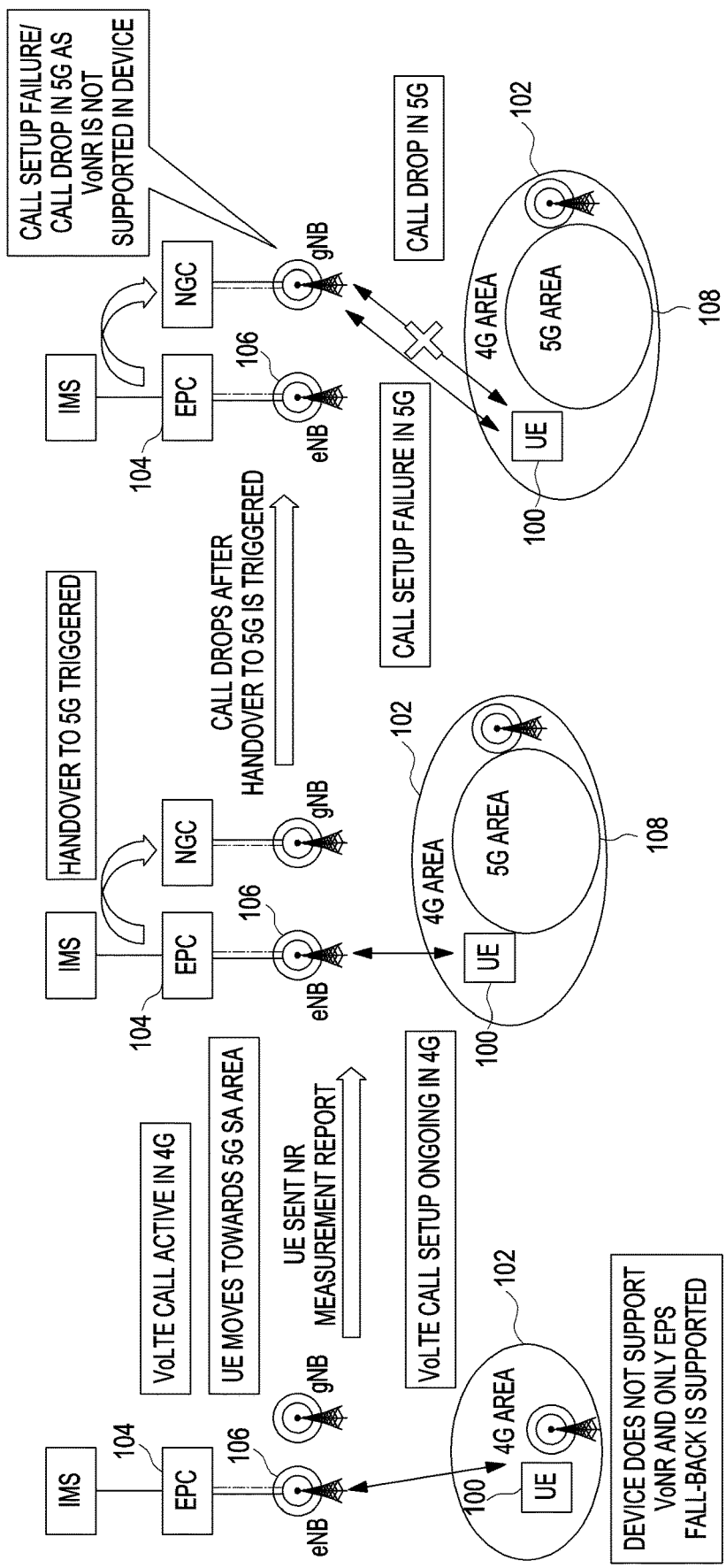
FIG. 1A is a schematic diagram illustrating handover failures and call drop due to voice over new radio (VoNR) not supported either by a user equipment (UE) or a network for which is triggered, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method and a UE for avoiding call drop by preventing handover during a VOLTE call.

In an embodiment, the proposed method and the UE discloses delaying the Measurement Reports for event B1 and B2. In another embodiment, the UE (500) measures the NR cells and send an Intra-RAT Measurement Reports for events A2/A3/A5 but don't send inter-RAT (IRAT) NR Measurement Reports for events B1/B2 until the VOLTE call is disconnected. Once the VOLTE call is disconnected, the UE (500) measures the NR cell and send the measurement reports for event B1 and B2 for handover.

For clarity and better understanding of the specification, terminologies used in the specification and their meaning is provided below.

VOLTE: An application resident in the UE performing a client function.

VoNR: voice over new radio (NR) for supporting PS voice over NR.

IRAT: inter-radio access technology

Measurement Report: Neighboring cell measurement report from UE to network.

FR2: Bands operating in Frequency>6 GHz

RRC Reconfiguration request: Signaling message from network

Referring now to the drawings, and more particularly to FIGS. 1A, 1B, and 2 through 12, where similar reference characters denote corresponding features consistently throughout the figures, there are shown preferred embodiments.

FIG. 1A is a schematic diagram illustrating handover failures and call drop due to VoNR not supported either by a UE (100) or a network for which is triggered, according to the related art.

Referring to FIG. 1A, the UE (100) is in a 4G network area (102) and is connected to an evolved packet core (EPC) (104) using an eNB (106). Here, the UE (100) does not support voice over new radio (VoNR) and only support EPS fall-back.

A VOLTE call is ongoing at the UE (100). The UE (100) is moving from the 4G network area (102) towards a 5G network area (108). Due to movement of the UE (100) towards the 5G network area (108) a handover from 4G network to 5G network is triggered. However, since the UE (100) does not support VoNR the ongoing VOLTE call is dropped in 5G network, due to call setup failure.

Thus, there is a need to avoid handover in order to prevent call drop while moving from the 4G network area (102) to the 5G network area (108).

Figure 1B:
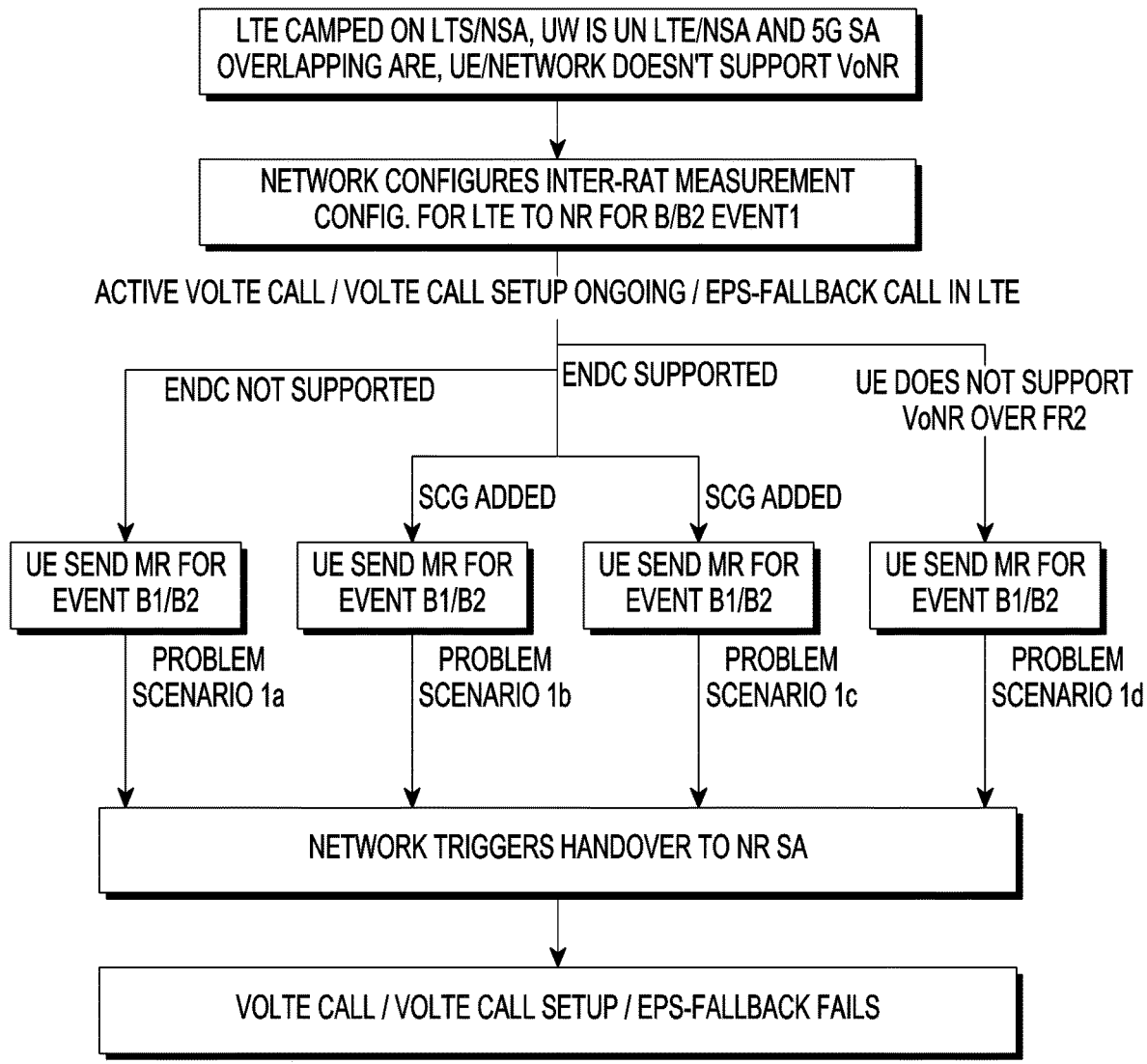
FIG. 1B is a block diagram, illustrating different problem scenarios relating to call drop according to the related art.

FIG. 1B is a block diagram, illustrating different problem scenarios selecting a target Edge Application Server according to the related art.

Referring to FIG. 1B, problem scenarios 1a indicates call drop when ENDC is not supported by the UE, problem scenarios 1b indicates call drop when ENDC is supported by the UE and secondary cell groups are added, problem scenarios 1c indicates call drop when ENDC is supported by the UE and secondary cell groups are not added, problem scenarios 1d indicates call drop when UE does not support VoNR over frequency range 2 (FR2).

Figure 2:
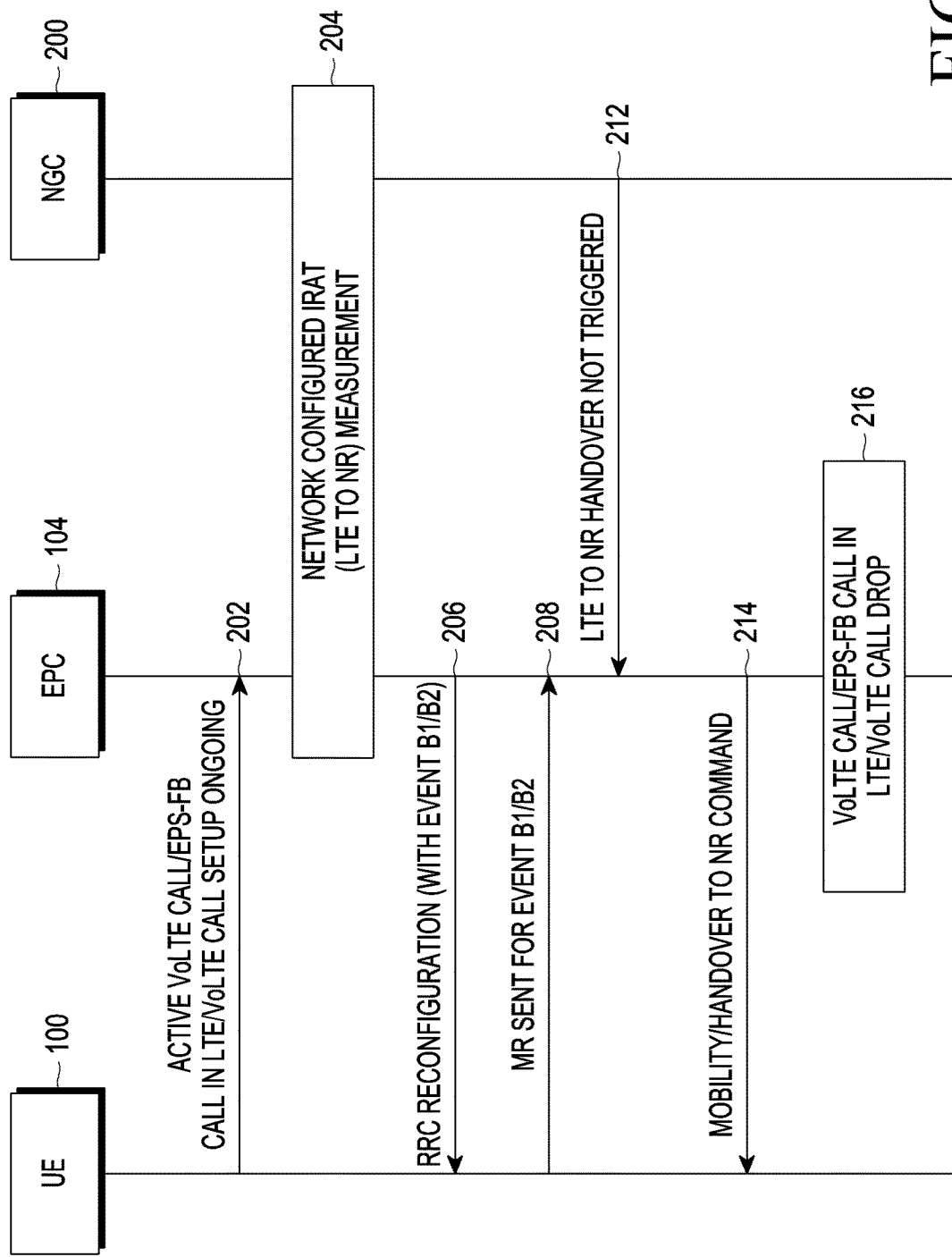
FIG. 2 is a sequence diagram, illustrating the call drop scenario during long term evolution (LTE) to new radio (NR) handover, when the UE and a 5th generation (5G) network doesn't support VoNR, according to the related art.

FIG. 2 is a sequence diagram, illustrating the call drop scenario during LTE to NR handover, when the UE and the 5G network doesn't support VONR, according to the related art.

In the embodiment, the EPC represent the 4G (LTE) network, the NGC represents the 5G (NR) network.

Referring to FIG. 2, at 202, the VOLTE call is ongoing at the UE (100) with the EPC (104). At 204, the EPC (104) configures IRAT measurements upon detecting that the UE (100) is moving from the 4G network area (102) towards the 5G network area (108).

At 206, the EPC (104) sends a radio resource control (RRC) Configuration request to the UE (100) for releasing radio bearers in order to perform handover. The RRC configuration request comprises B1 and B2 event.

At 208, the UE (100) sends the response of the RRC configuration request as measurement reports for B1 and B2 event with NR cell information.

At 212, when the handover from the LTE to NR is triggered, NGC (200) sends, to the EPC (104), information indicating that the handover from LTE to NR is triggered. At 214, the EPC (104) sends a handover command to the UE (100).

At 216, after the handover from the 4G network to the 5G network, the ongoing VOLTE call is dropped due to failure in call setup with the 5G network as neither the UE (100) nor the 5G network supports VONR.

Thus, there is a need to avoid handover in order to prevent call drop while moving from the 4G network to the 5G network.

Figure 3:
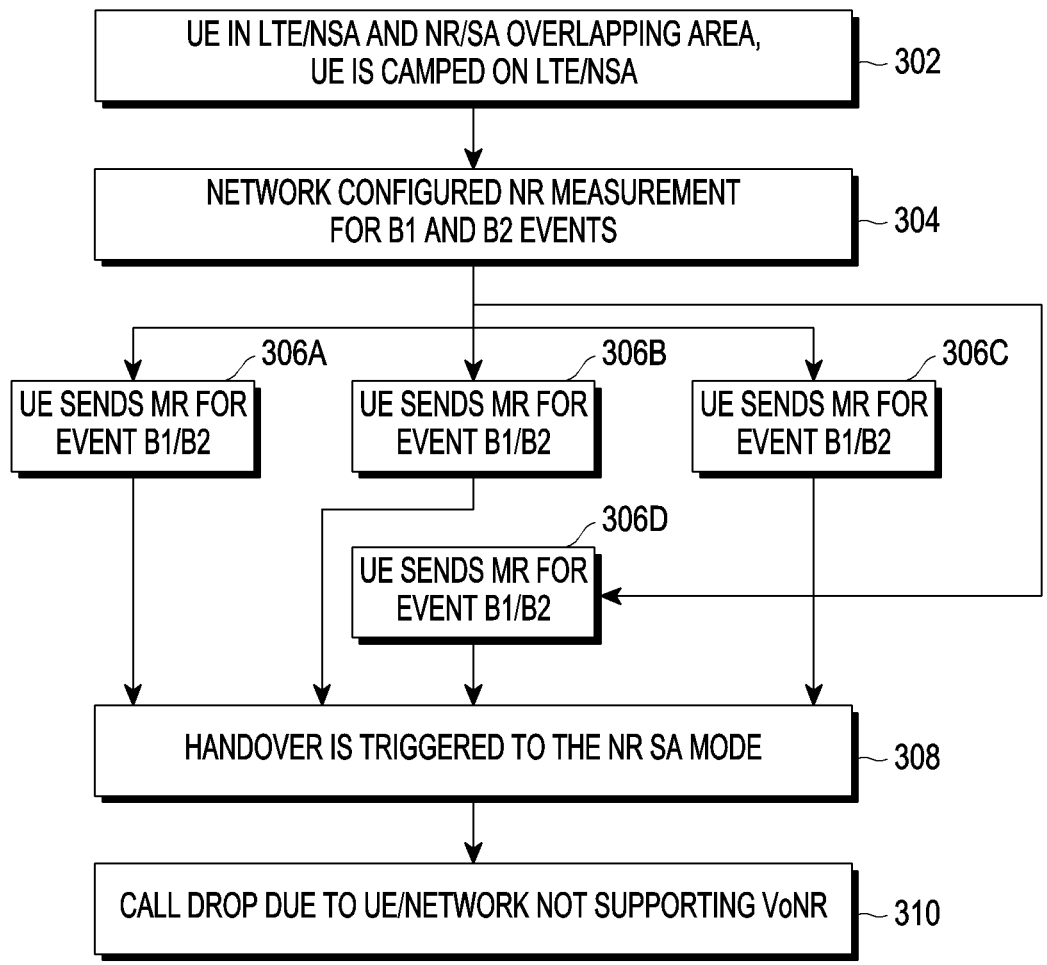
FIG. 3 is a flow diagram, illustrating the call drop scenario during LTE to NR handover, when the UE and doesn't support VONR, according to the related art.

FIG. 3 is a flow diagram, illustrating the call drop scenario during LTE to NR handover, when the UE and doesn't support VONR, according to the related art.

Referring to FIG. 3, at 302 the UE (100) is camped on LTE/NSA mode and is present in LTE/NSA and 5G SA overlapping area. At 304, the 4G network configures the IRAT measurements upon detecting that the UE (100) is moving from the 4G network area towards the 5G network area.

Referring to FIG. 3, 306A indicates a scenario where the UE (100) does not supports ENDC, 306B indicates a scenario where the UE (100) supports ENDC and Secondary Cell Groups (SCG) are added, 306C indicates a scenario where the UE (100) supports ENDC and Secondary Cell Groups (SCG) are not added, and 306D indicates a scenario where the UE (100) doesn't support VONR over Frequency Range 2 (FR2).

At 306A, 306B, 306C and 306D, the UE (100) sends the NE measurement reports for event B1 and B2.

At 308, the handover is triggered to the NR SA mode. At 310, the ongoing call at the UE (100) is dropped due to failure in call setup with the 5G network as neither the UE (100) nor the 5G network supports VONR.

Thus, there is a need to avoid handover in order to prevent call drop while moving from the 4G network to the 5G network.

Figure 4:
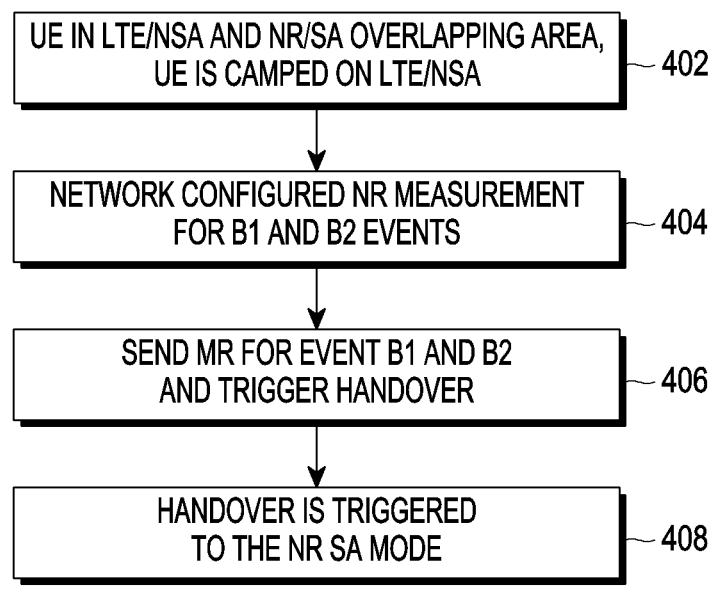
FIG. 4 is a flow diagram, illustrating the call drop scenario during LTE to NR handover, when the 5G network doesn't support VONR, according to the related art.

FIG. 4 is a flow diagram, illustrating the call drop scenario during LTE to NR handover, when the 5G network doesn't support VONR, according to the related art.

Referring to FIG. 4, at 402 the UE (100) is camped on LTE/NSA mode and is present in LTE/NSA and 5G SA overlapping area. At 404, the 4G network configures the IRAT measurements upon detecting that the UE (100) is moving from the 4G network area towards the 5G network area.

At 406, the UE (100) sends the NE measurement reports for event B1 and B2.

At 408, the handover is triggered to the NR SA mode. At 410, the ongoing call at the UE (100) is dropped due to failure in call setup with the 5G network as neither the UE (100) nor the 5G network supports VONR.

Thus, there is a need to avoid handover in order to prevent call drop while moving from the 4G network to the 5G network.

Figure 5:
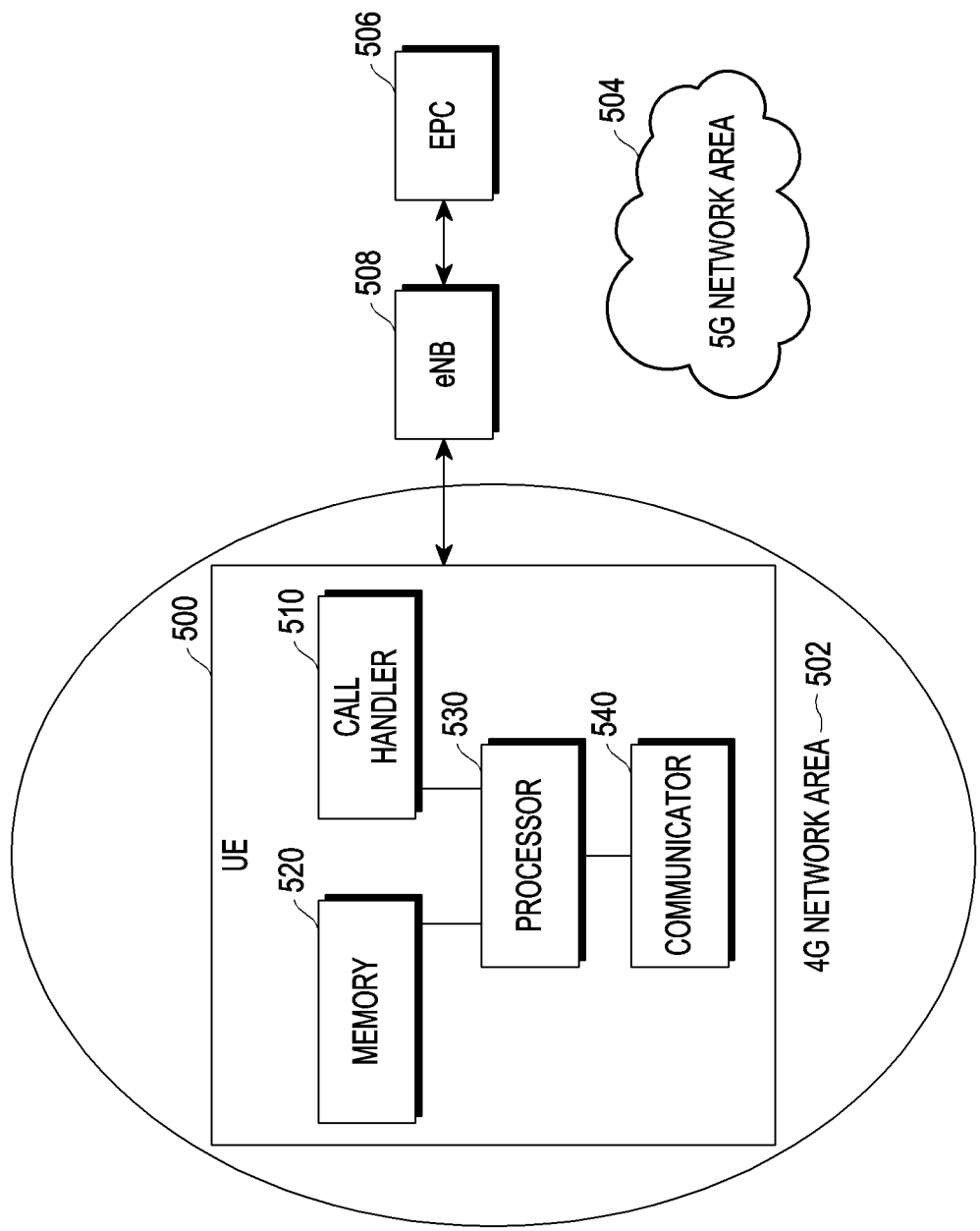
FIG. 5 illustrates a block diagram of a UE for preventing call drop due to handover from a 4th generation (4G) network area to a 5G network area, according to an embodiment of the disclosure.

FIG. 5 illustrates a block diagram of a UE (500) for preventing call drop due to handover from a 4G network area (502) to a 5G network area (504), according to an embodiment of the disclosure.

Referring to FIG. 5, the UE (500) may be, for example, but not limited, to a mobile device, a smart watch, a cellular phone, a smart phone, a Personal Digital Assistant (PDA), a tablet computer, a laptop computer, an Internet of things (IoT) device, an Artificial intelligent (AI) device or the like. The UE (500) is presently in the 4G network area (502) and is connected to the EPC (506) through the eNB (508).

The UE (500) includes a call handler (510), a memory (520), a processor (530), and a communicator (540).

In an embodiment, the VOLTE call is ongoing at the UE (500). The UE (500) is moving from the 4G network area (502) to a 5G network area (504) in SA mode. Upon detecting the movement of the UE (500), the EPC (506) configures IRAT measurement for handover from the EPC (506) to an NGC (512) through gNB (514). Further, the UE (500) received RRC configuration request from the EPC (506) comprising events B1 and B2.

In response to the RRC configuration request, in the related arts, the NR measurements reports are sent. However, in the disclosure, the proposed method discloses delaying the sending of the measurement reports for event B1 and B2.

In an embodiment, when the UE (500) does not support ENDC as well as VoNR, the UE (500) does not measures the NR cell and does not send the measurement reports for event B1 and B2 until the ongoing call is disconnected at the UE (500). Thus, the handover from the EPC (506) to the NGC (512) is not triggered till the VOLTE call is disconnected. Once the VOLTE call is disconnected, the UE (500) measures the NR cell and send the measurement reports for event B1 and B2 for handover.

In an embodiment, when the UE (500) does not support ENDC as well as VoNR, the UE (500) measures the NR cell and send the measurement reports for event B1 and B2. In response to the measurement report, the UE (500) receives a handover to the NR command. However, the UE (500) does not responds to the handover command until the ongoing call is disconnected at the UE (500). Thus, the handover from the EPC (506) to the NGC (512) is not triggered till the VOLTE call is disconnected. Once the VOLTE call is disconnected, the UE (500) responds to the handover command.

Thus, using the proposed method, a user of the UE (500) gets uninterrupted VOLTE call experience without any call drop and call setup delays or In another embodiment, when the UE (500) supports ENDC and does not support VONR and the SCG are not added, then the UE (500) does not measures the NR cell and does not send the measurement reports for event B1 and B2 until the ongoing call is disconnected at the UE (500). Thus, the handover from the EPC (506) to the NGC (512) is not triggered till the VOLTE call is disconnected. Once the VOLTE call is disconnected, the UE (500) measures the NR cell and send the measurement reports for event B1 and B2 for handover.

In an embodiment, when the UE (500) support ENDC and does not support VONR and the SCG are not added, the UE (500) measures the NR cell and send the measurement reports for event B1 and B2. In response to the measurement report, the UE (500) receives a handover to the NR command. However, the UE (500) does not responds to the handover command until the ongoing call is disconnected at the UE (500). Thus, the handover from the EPC (506) is not triggered till the VOLTE call is disconnected.

Thus, using the proposed method, a user of the UE (500) gets uninterrupted VOLTE call experience without any call drop and call setup delays or failures.

In yet another embodiment, when the UE (500) support ENDC and does not support VONR and the SCG are added, then the UE (500) measures the NR cell and send the measurement reports for event B1 and B2. In response to the measurement report, the UE (500) receives the handover to the NR command. However, the UE (500) does not responds to the handover command until the ongoing call is disconnected at the UE (500). Thus, the handover from the EPC (506) is not triggered till the VOLTE call is disconnected.

In another embodiment, when the UE (500) support ENDC and does not support VONR and the SCG are added, then the UE (500) measures the NR cells and send an Intra-RAT Measurement Reports for events A2/A3/A5 but don't send IRAT NR Measurement Reports for events B1/B2 until the VOLTE call is disconnected. Once the VOLTE call is disconnected, the UE (500) measures the NR cell and send the measurement reports for event B1 and B2 for handover.

In an embodiment, when the UE (500) does not support VONR over FR2, the UE (500) does not measures the NR cell and does not send the measurement reports for event B1 and B2 until the ongoing call is disconnected at the UE (500). Thus, the handover from the EPC (506) to the NGC (512) is not triggered till the VOLTE call is disconnected. Once the VOLTE call is disconnected, the UE (500) measures the NR cell and send the measurement reports for event B1 and B2 for handover.

In yet another embodiment, when the UE (500) does not support VONR over FR2, then the UE (500) measures the FR2 cells and send the measurement reports for event B1 and B2 for FR2 cells. In response to the measurement report, the UE (500) receives the handover to the NR command. However, the UE (500) does not responds to the handover command until the ongoing call is disconnected at the UE (500). Thus, the handover from the EPC (506) is not triggered till the VOLTE call is disconnected.

In yet another embodiment, when the UE (500) does not support VONR for FR2, then the UE (500) measures the FR2 cells and send an Intra-RAT Measurement Reports for events A2/A3/A5 for FR2 cells but doesn't send IRAT NR Measurement Reports for events B1/B2 until the VOLTE call is disconnected. Once the VOLTE call is disconnected, the UE (500) measures the NR cell and send the measurement reports for event B1 and B2 for handover.

Thus, using the proposed method, a user of the UE (500) gets uninterrupted VOLTE call experience without any call drop and call setup delays or failures, when the UE (500) doesn't support VONR over FR2.

In an embodiment, when the 5G network doesn't support the VoNR and the UE (500) supports the VoNR, then the UE (500) maintains a list of NR SA cells on registration area level, which indicates whether the cells in the list supports VONR or not. The UE (500) uses call history in order to create such database. If UE (500) is successfully able to establish the VoNR call on NR SA cell without EPS fallback, then such cell details will be updated in the local database.

Thus, using the proposed method, a user of the UE (500) gets uninterrupted VOLTE call experience without any call drop and call setup delays or In an embodiment, the memory (520) in the UE (210) stores instructions to be executed by the processor (530) for preventing call drop by avoiding handovers when at least one of the UE (500) or the 5G network does not support VONR.

The memory (520) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (520) may, in some examples, be considered a non-transitory storage medium. The term "non-transitory" may indicate that the storage medium is not embodied in a carrier wave or a propagated signal. However, the term "non-transitory" should not be interpreted that the memory (520) is non-movable. In some examples, the memory (520) can be configured to store larger amounts of information than the memory. In certain examples, a non-transitory storage medium may store data that can, over time, change (e.g., in Random Access Memory (RAM) or cache). The memory (520) can be an internal storage or it can be an external storage of the UE (500), a cloud storage, or any other type of external storage.

In an embodiment, the processor (530) communicates with the memory (520), the communicator (540), and the call handler (510)

The processor (530) is configured to execute instructions stored in the memory (520) for avoiding ongoing call drop due to handover to the 5G network.

The processor (530) may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In an embodiment, the communicator (540) is configured for communicating internally between internal hardware components and with external devices via one or more networks. The communicator (540) includes an electronic circuit specific to a standard that enables wired or wireless communication.

Although FIG. 5 shows various hardware components of the UE (500) but it is to be understood that other embodiments are not limited thereon. In other embodiments, the UE (500) may include a lessor or greater number of components. Further, the labels or names of the components are used only for illustrative purpose and does not limit the scope of the disclosure. One or more components can be combined together to perform same or substantially similar function of preventing handover when the UE (500) doesn't support VoNR such that the ongoing call at the UE (500) is not dropped.

Figure 6:
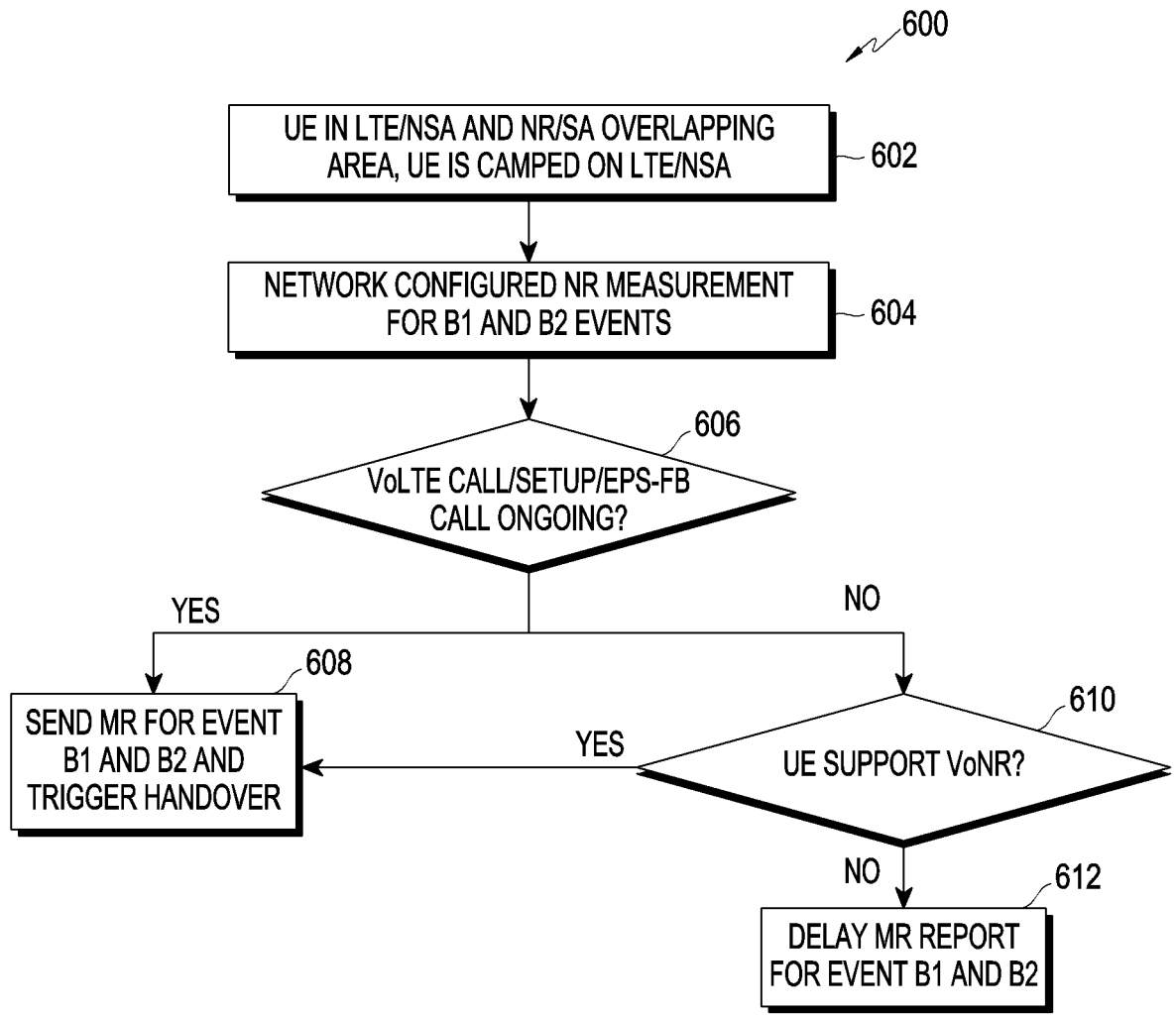
FIG. 6 is a flow illustrating a method flow for preventing call drop by avoiding handovers when the UE does not support VONR, according to an embodiment of the disclosure.

FIG. 6 is a flow illustrating a method flow 600 for preventing call drop by avoiding handovers when the UE (500) does not support VONR, according to an embodiment of the disclosure.

Referring to FIG. 6, at 602, the UE (500) is in LTE/NSA and NR SA overlapping area and is camped on the LTE cell in NSA mode.

At 604, the 4G network configures the NR measurement configuration for event B1 and B2.

At 606, the UE (500) determines whether the VOLTE/ EPS-FB call is ongoing or the VOLTE call setup in ongoing. In an embodiment, if the VOLTE/EP-FB call or the VOLTE call setup is ongoing, then the flow 600 proceeds to 608 else to 610.

At 608, the UE (500) sends measurement reports for the event B1 and B2 and handover from the 4G network to the 5G network is triggered as there is no ongoing call at the UE (500).

At 610, the flow 600 comprises determining whether the UE (500) supports VONR.

The flow 600 proceeds to 608 in response to determining that the UE (500) supports VONR or else to 612. At 612, the UE (500) delays sending of the measurement report associated with event B1 and B2.

The various embodiment for delaying the measurement reports associated with the event B1 and B2 are explained in sequence diagrams 7-10.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the disclosure.

Figure 7:
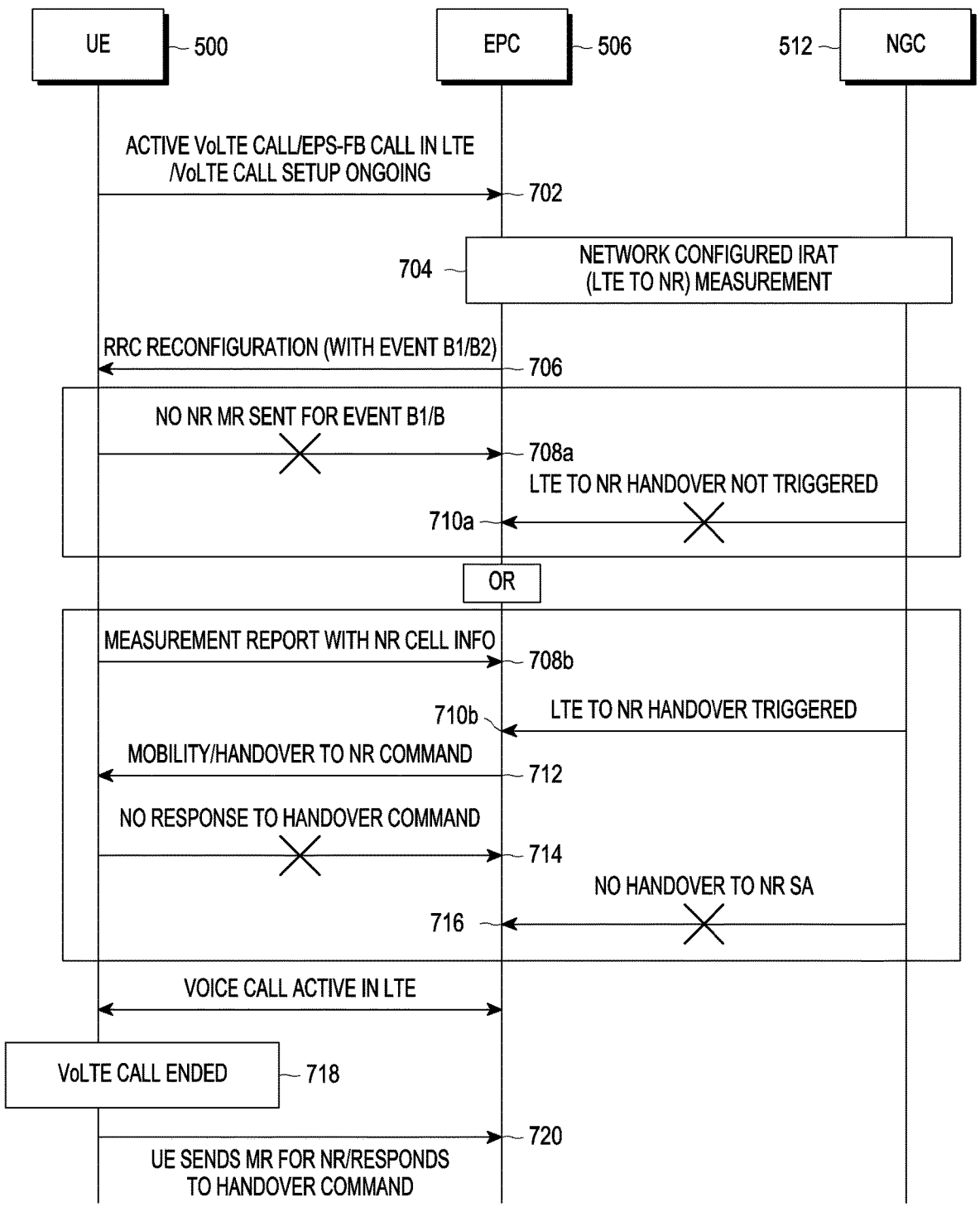
FIG. 7 is a sequence diagram, illustrating the sequence for avoiding call drop when the UE moves from the 4G network area to the 5G network area and where the UE and the 5G network does not support VONR, according to an embodiment of the disclosure.

FIG. 7 is a sequence diagram, illustrating the sequence for avoiding call drop when the UE (500) moves from the 4G network area to the 5G network area and where the UE (500) and the 5G network does not support VONR, according to an embodiment of the disclosure.

Referring to FIG. 7, the UE (500) is connected to the EPC (506) and the VOLTE call is ongoing at the UE (500). The user using the UE (500) is presently in the 4G network area and is moving towards the 5G network area. Further, the UE (500) and the 5G network (NGC) (512) does not support VONR and hence when the handover from the EPC (506) to NGC (512) is triggered, the user experiences call drop. In order to avoid the call drop, the UE (500) prevents the handover from the EPC (506) to NGC (512) as described below.

At 702, one of the active VOLTE call, the VOLTE call setup, or the EPS-FB call is ongoing at the (500). At 704, upon detection of the UE (500) in the 5G network area, the EPC (506) configures the IRAT measurements.

At 706, the EPC (506) sends the RRC reconfiguration request to the UE (500), wherein the re-configuration request comprises event B1 and B2.

At 708*a*, the UE (500) do not measure the NR cell and hence no measurement report is sent to the EPC (506) and the NGC (512). Thus, the handover from the EPC (506) to the NGC (512) is not initiated as seen at 710*a*. Once the active VOLTE call at the UE (500) is disconnected at 714, the UE (500) sends measurement report to the EPC (506) for handover at 716.

In another embodiment, after receiving the RRC reconfiguration request with the event B1 and B2, the UE (500) measures the NR cell and sends the measurement report for event B1 and B2 is sent to the EPC (506) at 708*b*. At 710*b*, the EPC (506) to NGC (512) handover is triggered. At 712, the EPC (506) sends the handover from EPC (506) to NGC (512) command to the UE (500). However, the UE (500) does not responds to the handover command as seen at 714. Thus, the handover is not performed as seen at 716.

Once the VOLTE call is disconnected at 718, the UE (500) responds to the handover command at 720.

Thus, as seen in the above sequence, the handover from the EPC (506) to the NGC (512) is not initiated until the VOLTE call is disconnected. Once the active VOLTE call at the UE (500) is disconnected, the UE (500) sends measurement report and/or responds to the handover command to the EPC (506) for handover.

Using the proposed method, ensure uninterrupted voice service even when the UE (500) is moving from the 4G network area to the 5G network area.

Figure 8:
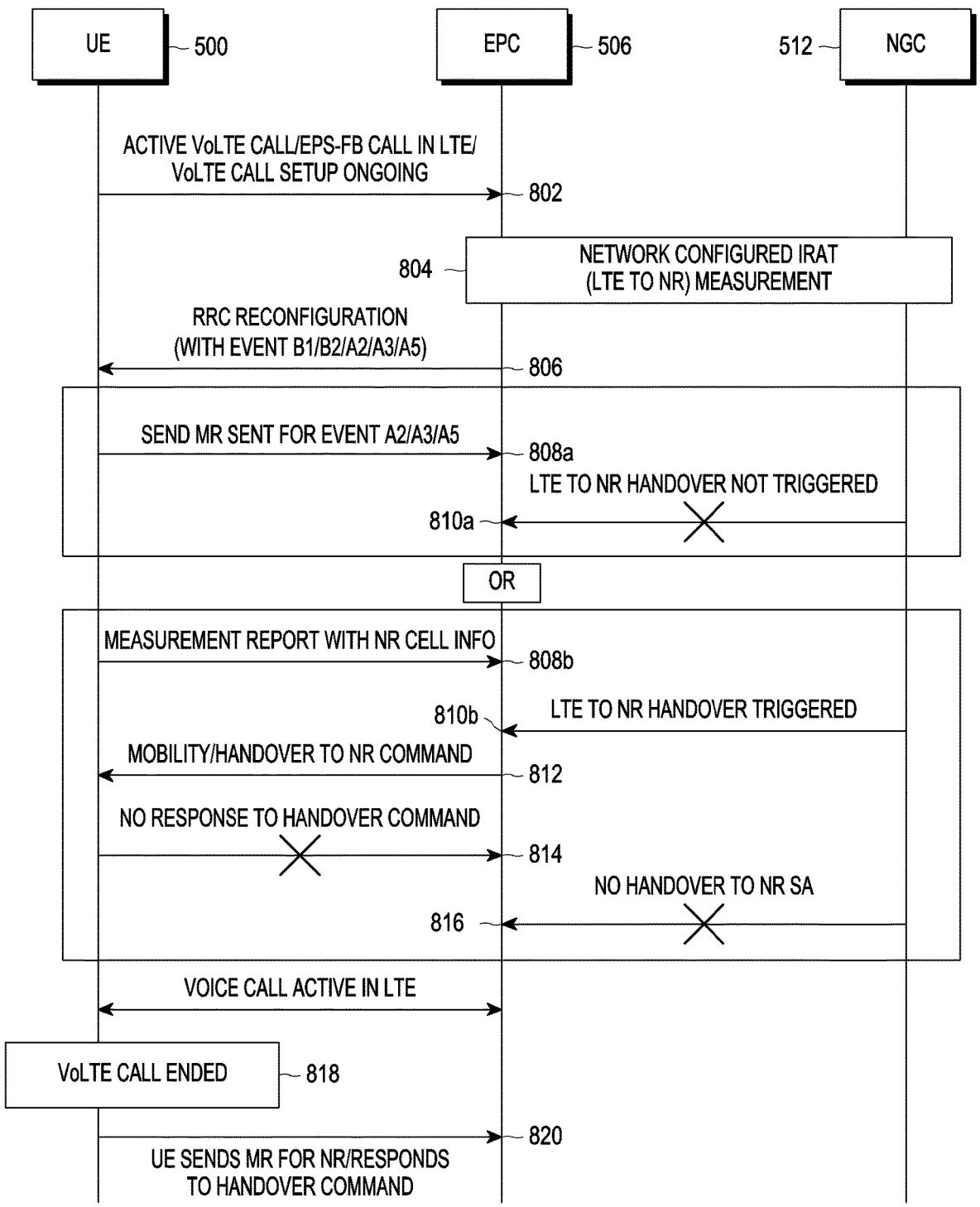
FIG. 8 is a sequence diagram, illustrating the sequence for avoiding call drop when the UE moves from the 4G network area to the 5G network area and where the UE and the 5G network does not support VONR, according to an embodiment of the disclosure.

FIG. 8 is a sequence diagram, illustrating the sequence for avoiding call drop when the UE (500) moves from the 4G network area to the 5G network area and where the UE (500) and the 5G network does not support VONR, according to an embodiment of the disclosure.

Referring to FIG. 8, the UE (500) is connected to the EPC (506) and the VOLTE call is ongoing at the UE (500). The user using the UE (500) is presently in the 4G network area and is moving towards the 5G network area. Further, the UE (500) and the 5G network (NGC) (512) does not support VONR and hence when the handover from the EPC (506) to NGC (512) is triggered, the user experiences call drop. In the embodiment, the UE does not support ENDC and the SCG are added. In order to avoid the call drop, the UE (500) prevents the handover from the EPC (506) to NGC (512) as described below.

At 802, one of the active VOLTE call, the VOLTE call setup, or the EPS-FB call is ongoing at the (500). At 804, upon detection of the UE (500) in the 5G network area, the EPC (506) configures the IRAT measurements.

At 806, the EPC (506) sends the RRC reconfiguration request to the UE (500), wherein the re-configuration request comprises event A2/A3/A5, B1 and B2.

At 808a, the UE (500) measure the NR cell for event A2/A3/A5, and sends measurement report to the EPC (506) and the NGC (512) for the event A2/A3/A5. However, the UE (500) does not measures the NR cells for event B1, B2 and hence does not send measurement report for the event B1 and B2 as seen at 810a.

Thus, the handover from the EPC (506) to the NGC (512) is not initiated. Once the active VOLTE call at the UE (500) is disconnected at 818, the UE (500) sends measurement report to the EPC (506) for event B1 and B2 for handover at 820.

In another embodiment, after receiving the RRC reconfiguration request with the event B1 and B2, the UE (500) measures the NR cell and sends the measurement report for event B1 and B2 is sent to the EPC (506) at 808b. At 810b, the EPC (506) to NGC (512) handover is triggered. At 812, the EPC (506) sends the handover from EPC (506) to NGC (512) command to the UE (500). However, the UE (500) does not responds to the handover command as seen at 814. Thus, the handover is not performed as seen at 816.

Once the VOLTE call is disconnected at 818, the UE (500) responds to the handover command at 820.

Thus, as seen in the above sequence, the handover from the EPC (506) to the NGC (512) is not initiated until the VOLTE call is disconnected. Once the active VOLTE call at the UE (500) is disconnected, the UE (500) sends measurement report and/or responds to the handover command to the EPC (506) for handover.

Using the proposed method, ensures uninterrupted voice service even when the UE (500) is moving from the 4G network area to the 5G network area.

Figure 9:
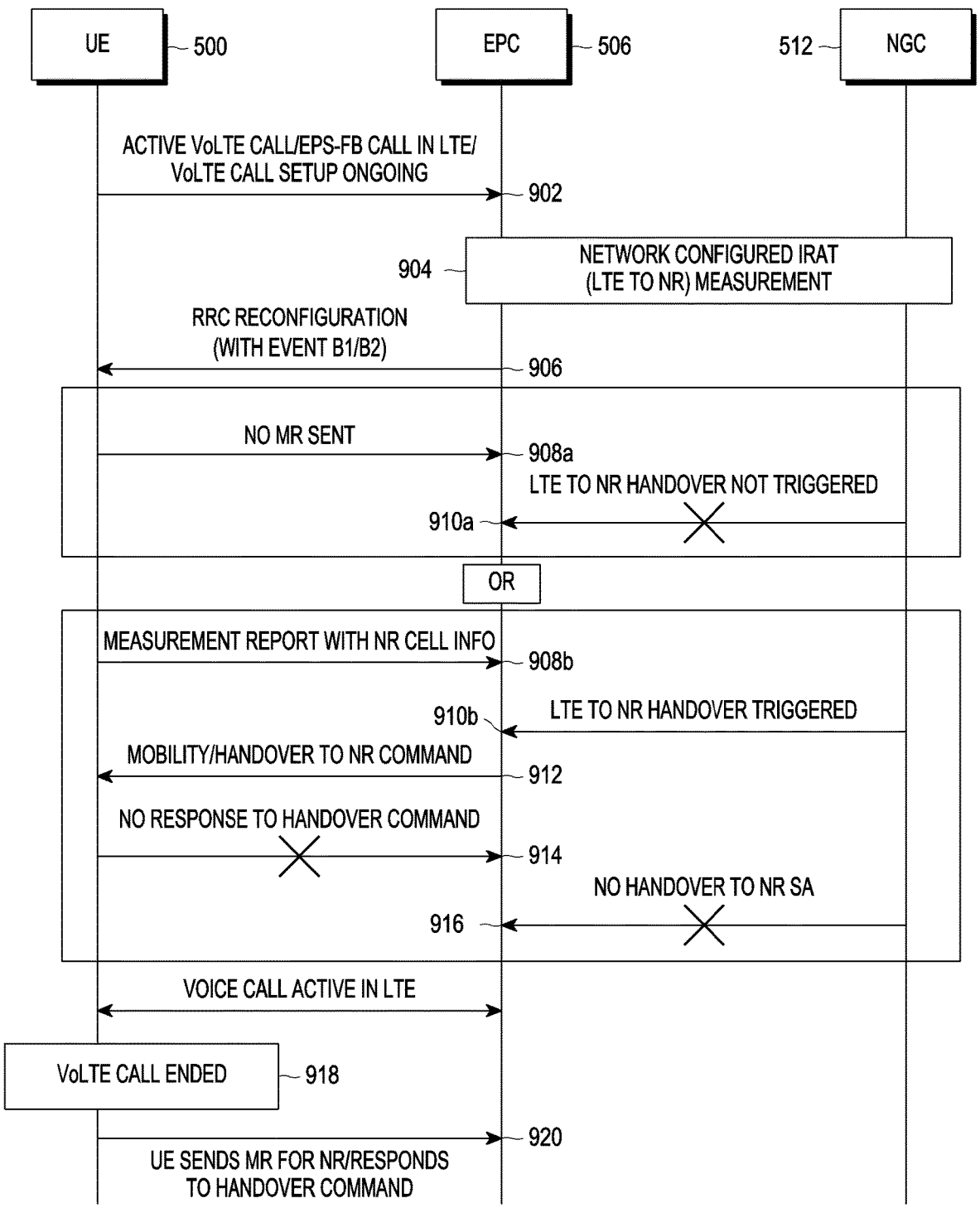
FIG. 9 is a sequence diagram, illustrating the sequence for avoiding call drop when the UE moves from the 4G network area to the 5G network area and where the UE and the 5G network does not support VONR, according to an embodiment of the disclosure.

FIG. 9 is a sequence diagram, illustrating the sequence for avoiding call drop when the UE (500) moves from the 4G network area to the 5G network area and where the UE (500) and the 5G network does not support VONR, according to an embodiment of the disclosure.

Referring to FIG. 9, the UE (500) is connected to the EPC (506) and the VOLTE call is ongoing at the UE (500). The user using the UE (500) is presently in the 4G network area and is moving towards the 5G network area. Further, the UE (500) and the 5G network (NGC) (512) does not support VONR and hence when the handover from the EPC (506) to NGC (512) is triggered, the user experiences call drop. In the embodiment, the UE does not support ENDC and the SCG are not added. In order to avoid the call drop, the UE (500) prevents the handover from the EPC (506) to NGC (512) as described below.

At 902, one of the active VOLTE call, the VOLTE call setup, or the EPS-FB call is ongoing at the (500). At 904, upon detection of the UE (500) in the 5G network area, the EPC (506) configures the IRAT measurements.

At 906, the EPC (506) sends the RRC reconfiguration request to the UE (500), wherein the re-configuration request comprises event B1 and B2.

At 908a, the UE (500) does not measure the NR cell for event B1 and B2, and hence does not send any measurement report to the EPC (506) and the NGC (512) for the event.

Thus, the handover from the EPC (506) to the NGC (512) is not initiated as seen at 910a. Once the active VOLTE call at the UE (500) is disconnected at 918, the UE (500) sends measurement report to the EPC (506) for event B1 and B2 for handover at 920.

In another embodiment, after receiving the RRC reconfiguration request with the event B1 and B2, the UE (500) measures the NR cell and sends the measurement report for event B1 and B2 is sent to the EPC (506) at 908b. At 910b, the EPC (506) to NGC (512) handover is triggered. At 912, the EPC (506) sends the handover from EPC (506) to NGC (512) command to the UE (500). However, the UE (500) does not responds to the handover command as seen at 914. Thus, the handover is not performed as seen at 916.

Once the VOLTE call is disconnected at 918, the UE (500) responds to the handover command at 920.

Thus, as seen in the above sequence, the handover from the EPC (506) to the NGC (512) is not initiated until the VOLTE call is disconnected. Once the active VOLTE call at the UE (500) is disconnected, the UE (500) sends measurement report and/or responds to the handover command to the EPC (506) for handover.

Using the proposed method, ensures uninterrupted voice service even when the UE (500) is moving from the 4G network area to the 5G network area.

Figure 10:
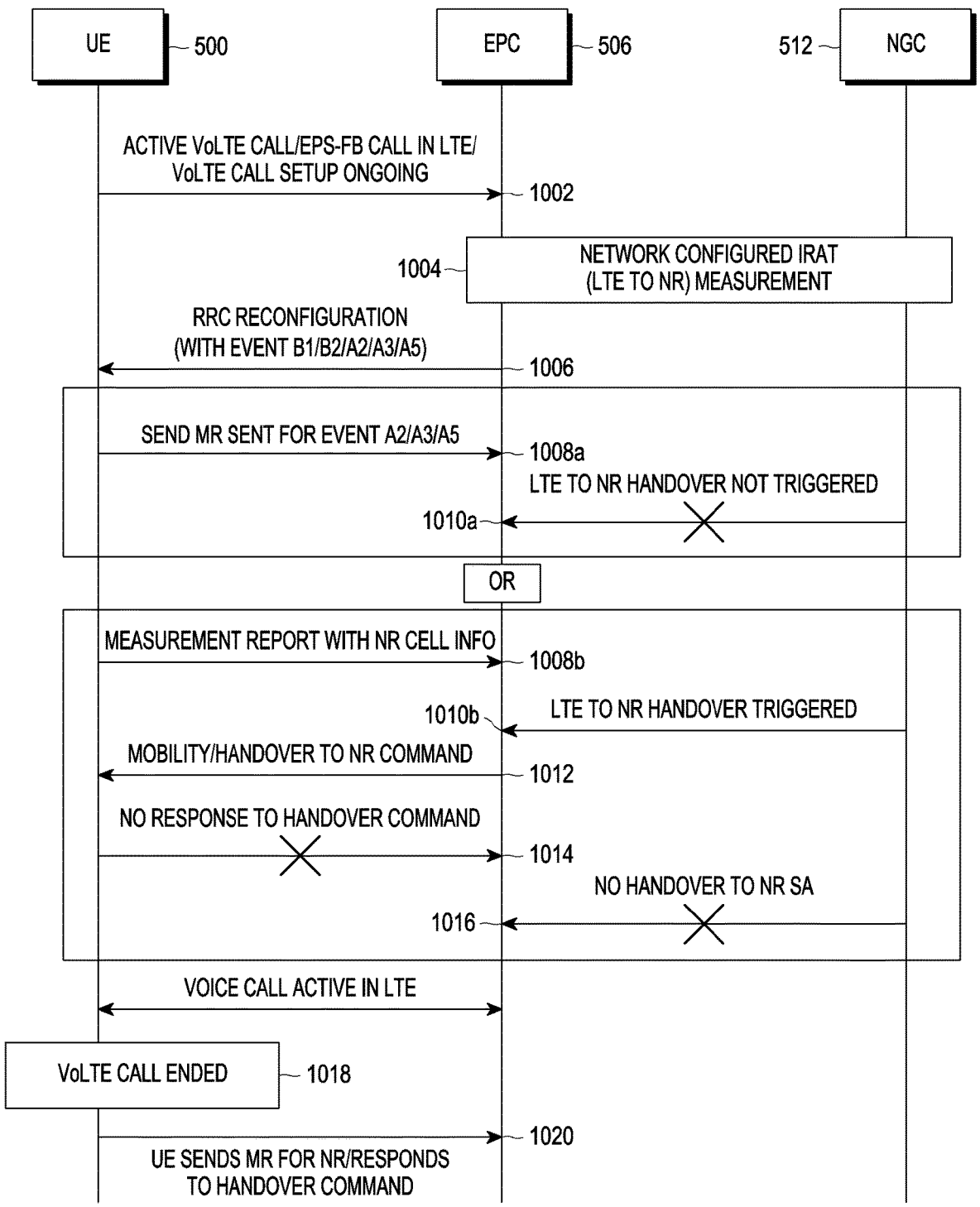
FIG. 10 is a sequence diagram, illustrating the sequence for avoiding call drop when the UE moves from the 4G network area to the 5G network area and where the UE and the 5G network does not support VONR, according to an embodiment of the disclosure.

FIG. 10 is a sequence diagram, illustrating the sequence for avoiding call drop when the UE (500) moves from the 4G network area to the 5G network area and where the UE (500) and the 5G network does not support VONR, according to an embodiment of the disclosure.

Referring to FIG. 10, the UE (500) is connected to the EPC (506) and the VOLTE call is ongoing at the UE (500). The user using the UE (500) is presently in the 4G network area and is moving towards the 5G network area. Further, the UE (500) does not support VONR over FR2 and hence when the handover from the EPC (506) to NGC (512) is triggered, the user experiences call drop. In the embodiment, the UE does not support ENDC and the SCG are not added. In order to avoid the call drop, the UE (500) prevents the handover from the EPC (506) to NGC (512) as described below.

At 1002, one of the active VOLTE call, the VOLTE call setup, and the EPS-FB call is ongoing at the (500). At 1004, upon detection of the UE (500) in the 5G network area, the EPC (506) configures the IRAT measurements.

At 1006, the EPC (506) sends the RRC reconfiguration request to the UE (500), wherein the re-configuration request comprises event B1 and B2.

At 1008a, the UE (500) does not measure the NR cell for event B1 and B2, and hence does not send any measurement report to the EPC (506) and the NGC (512) for the event.

Thus, the handover from the EPC (506) to the NGC (512) is not initiated as seen in 1010a. Once the active VOLTE call at the UE (500) is disconnected at 1018, the UE (500) sends measurement report to the EPC (506) for event B1 and B2 for handover at 1020.

In another embodiment, after receiving the RRC reconfiguration request with the event B1 and B2, the UE (500) measures the NR cell and sends the measurement report for event B1 and B2 is sent to the EPC (506) at 1008b. At 1010b, the EPC (506) to NGC (512) handover is triggered. At 1012, the EPC (506) sends the handover from EPC (506) to NGC (512) command to the UE (500). However, the UE (500) does not responds to the handover command as seen at 1014. Thus, the handover is not performed as seen at 1016.

Once the VOLTE call is disconnected at 1018, the UE (500) responds to the handover command at 1020.

Thus, as seen in the above sequence, the handover from the EPC (506) to the NGC (512) is not initiated until the VOLTE call is disconnected. Once the active VOLTE call at the UE (500) is disconnected, the UE (500) sends measurement report and/or responds to the handover command to the EPC (506) for handover.

Using the proposed method, ensures uninterrupted voice service even when the UE (500) is moving from the 4G network area to the 5G network area.

Figure 11:
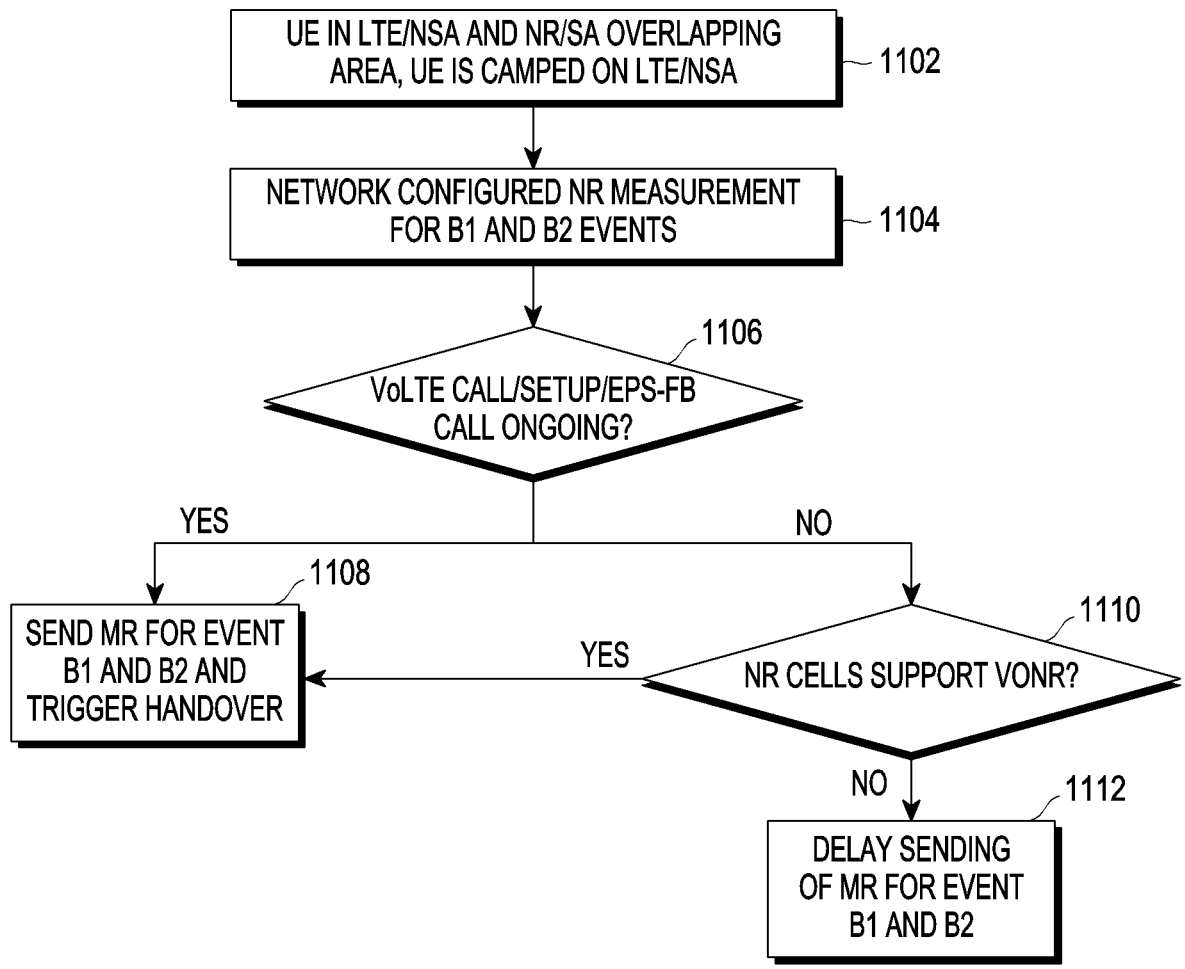
FIG. 11 is a flow diagram, illustrating a method flow 1100 for avoiding call drop due to handover from 4G network to 5G network, when the UE supports the VoNR and the 5G network doesn't support VONR according to an embodiment of the disclosure.

FIG. 11 is a flow diagram, illustrating a method flow 1100 for avoiding call drop due to handover from 4G network to 5G network, when the UE supports the VoNR and the 5G network doesn't support VONR according to an embodiment of the disclosure.

Referring to FIG. 11, at 1102, the UE (500) is in LTE/NSA and NR SA overlapping area and is camped on the LTE cell in NSA mode.

At 1104, the 4G network configures the NR measurement configuration for event B1 and B2.

At 1106, the UE (500) determines whether the VOLTE/EPS-FB call is ongoing or the VOLTE call setup in ongoing. In an embodiment, if the VOLTE/EP-FB call or the VOLTE call setup is ongoing, then the flow 1100 proceeds to 1108 else to 1110.

At 1108, the UE (500) sends measurement reports for the event B1 and B2 and handover from the 4G network to the 5G network is triggered as there is no ongoing call at the UE (500).

At 1110, the flow 600 comprises determining whether the NR cells supports VONR. In an embodiment, the UE (500) maintain the list comprising NR cells which support VoNR. Thus, the UE (500) determines whether the current available NR cell supports VONR or not by checking the NR cell in the list. The list comprising NR cell supporting VoNR are stored in a local database at the UE (500).

The flow 1100 proceeds to 1108 in response to determining that the NR cell supports VONR or else to 1112.

At 112, the UE (500) determines delays sending of the measurement report associated with event B1 and B2.

The various embodiment for delaying the measurement reports associated with the event B1 and B2 are explained below.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the disclosure.

Figure 12:
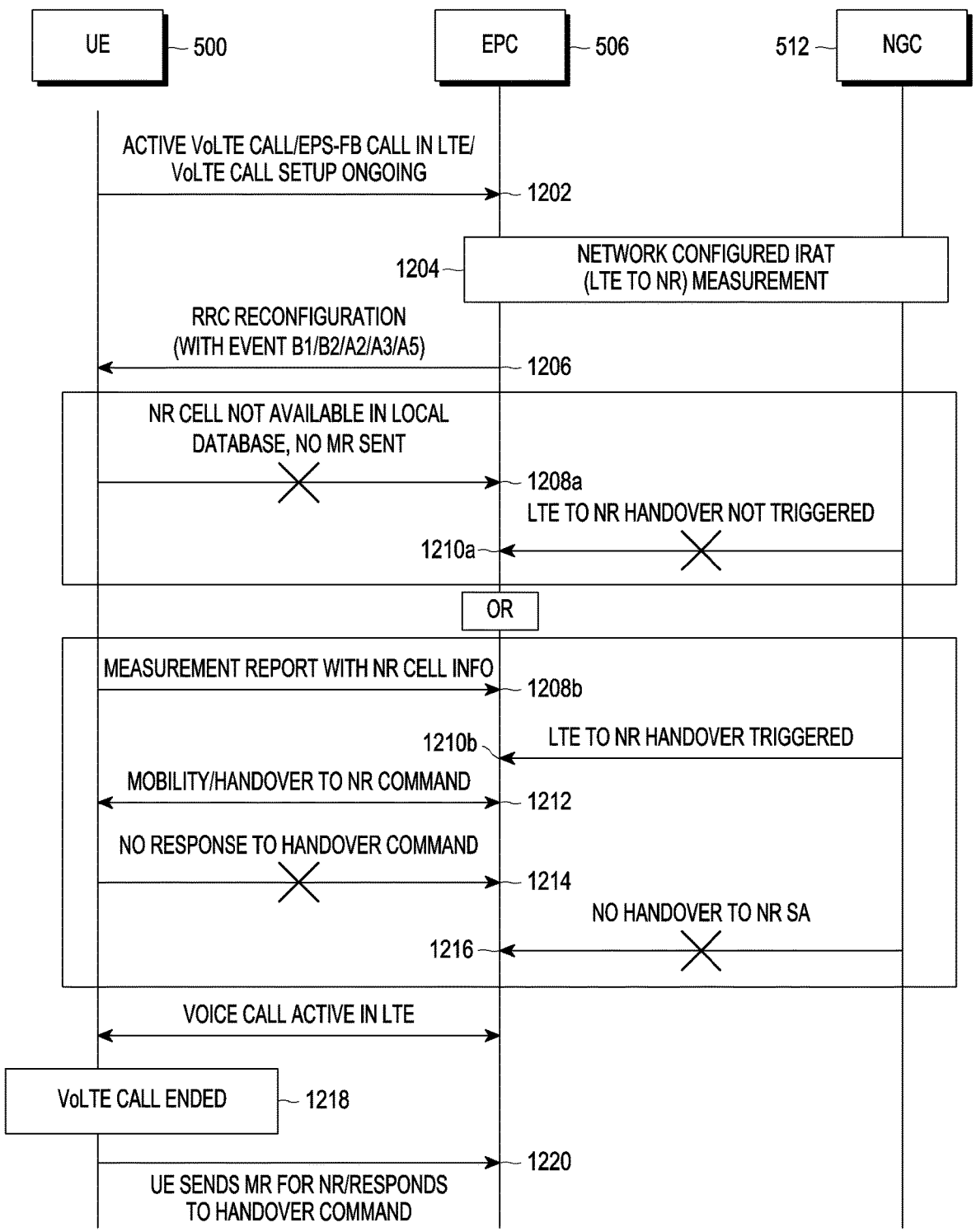
FIG. 12 is a sequence diagram, illustrating the sequence for avoiding call drop when the UE moves from the 4G network area to the 5G network area and where the UE supports VONR and the 5G network does not support VONR, according to an embodiment of the disclosure.

FIG. 12 is a sequence diagram, illustrating the sequence for avoiding call drop when the UE (500) moves from the 4G network area to the 5G network area and where the UE (500) supports VONR and the 5G network does not support VONR, according to an embodiment of the disclosure.

Referring to FIG. 12, the UE (500) is connected to the EPC (506) and the VOLTE call is ongoing at the UE (500). The user using the UE (500) is presently in the 4G network area and is moving towards the 5G network area. Further, the 5G network doesn't support and hence when the handover from the EPC (506) to NGC (512) is triggered, the user experiences call drop . . . . In order to avoid the call drop, the UE (500) prevents the handover from the EPC (506) to NGC (512) as described below.

At 1202, one of the active VOLTE call, the VOLTE call setup, or the EPS-FB call is ongoing at the UE (500). At 1204, upon detection of the UE (500) in the 5G network area, the EPC (506) configures the IRAT measurements.

At 1206, the EPC (506) sends the RRC reconfiguration request to the UE (500), wherein the re-configuration request comprises event B1 and B2.

At 1208a, the UE (500) determines whether the NR cell supports VONR by checking the local data base at the UE (500). In the embodiment, the NR cells does not support VONR and hence does not measure the NR cell for event B1 and B2, and hence does not send any measurement report to the EPC (506) and the NGC (512) for the event.

Thus, the handover from the EPC (506) to the NGC (512) is not initiated as seen at 1210a. Once the active VOLTE call at the UE (500) is disconnected at 1218, the UE (500) sends measurement report to the EPC (506) for event B1 and B2 for handover at 1220.

In another embodiment, after receiving the RRC reconfiguration request with the event B1 and B2, the UE (500) measures the NR cell and sends the measurement report for event B1 and B2 is sent to the EPC (506) at 1208b. The EPC (506) to NGC (512) handover is triggered at 1210b. At 1212, the EPC (506) sends the handover from EPC (506) to NGC (512) command to the UE (500). However, the UE (500) does not responds to the handover command as seen at 1214. Thus, the handover is not performed as seen at 1216.

Once the VOLTE call is disconnected at 1218, the UE (500) responds to the handover command at 1220.

Thus, as seen in the above sequence, the handover from the EPC (506) to the NGC (512) is not initiated until the VOLTE call is disconnected. Once the active VOLTE call at the UE (500) is disconnected, the UE (500) sends measurement report and/or responds to the handover command to the EPC (506) for handover.

Using the proposed method, ensures uninterrupted voice service even when the UE (500) is moving from the 4G network area to the 5G network area.

Figure 13:
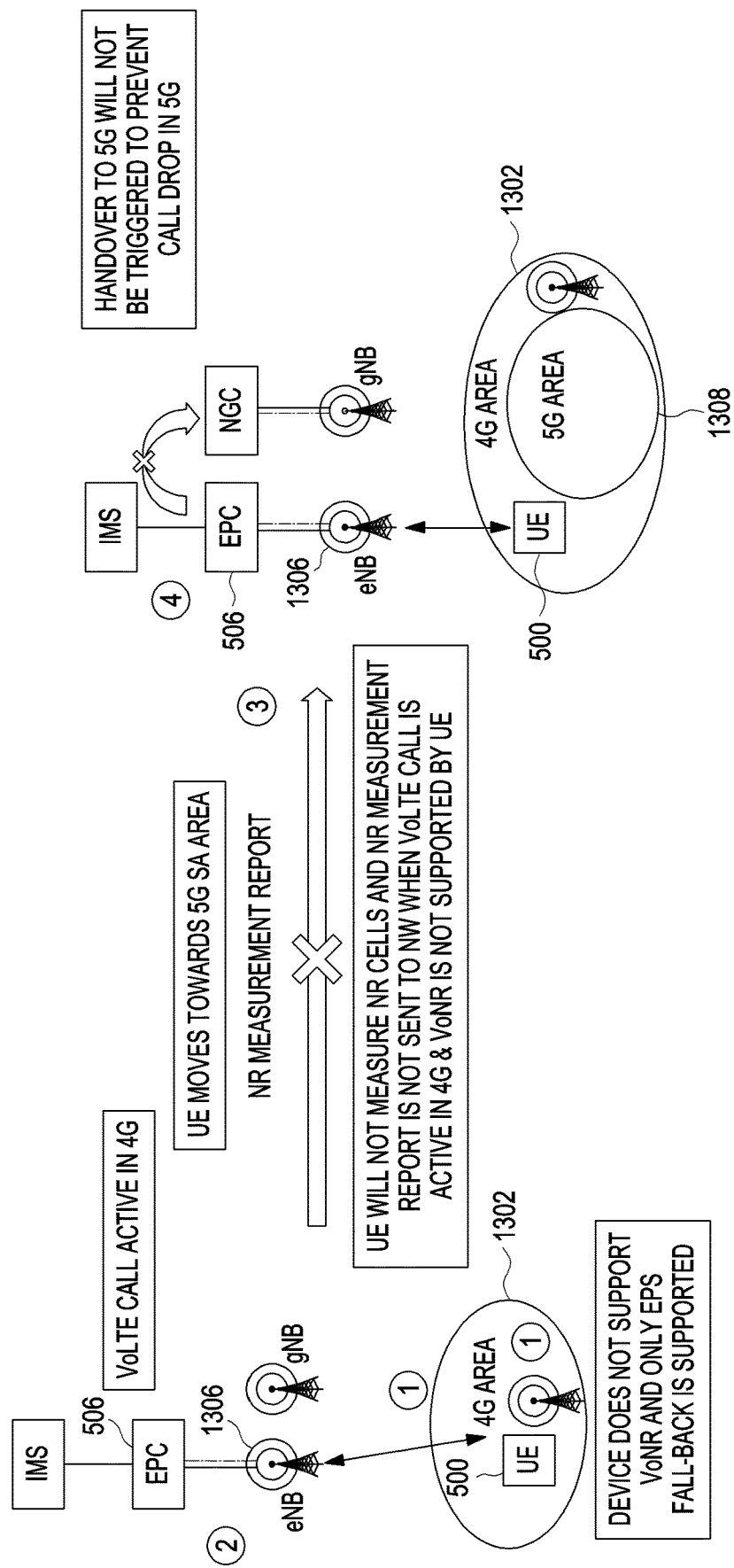
FIG. 13 is a schematic diagram, illustrating the proposed solution for avoiding call drop, according to an embodiment of the disclosure.

FIG. 13 is a schematic diagram, illustrating the proposed solution for avoiding call drop, according to an embodiment of the disclosure.

Referring to FIG. 13, the UE (500) is in a 4G network area (1302) and is connected to an EPC) (506 using an eNB (1306) at 1. In the embodiment, the UE (500) does not support VONR and only support EPS fall-back.

A VOLTE call is ongoing at the UE (500) at 2. At 3, the UE (500) is moving from the 4G network area (1302) towards a 5G network area (1308). Due to movement of the UE (500) towards the 5G network area (1308) a handover from 4G network to 5G network is triggered as seen at 4. However, since the UE (500) does not support VoNR the ongoing VOLTE call is dropped in 5G network, the proposed method discloses delaying sending MR report till the VOLTE call is completed.

Thus, the proposed method and device successfully prevent call drop while moving from the 4G network area (1302) to the 5G network area (1308).

Figure 14A:
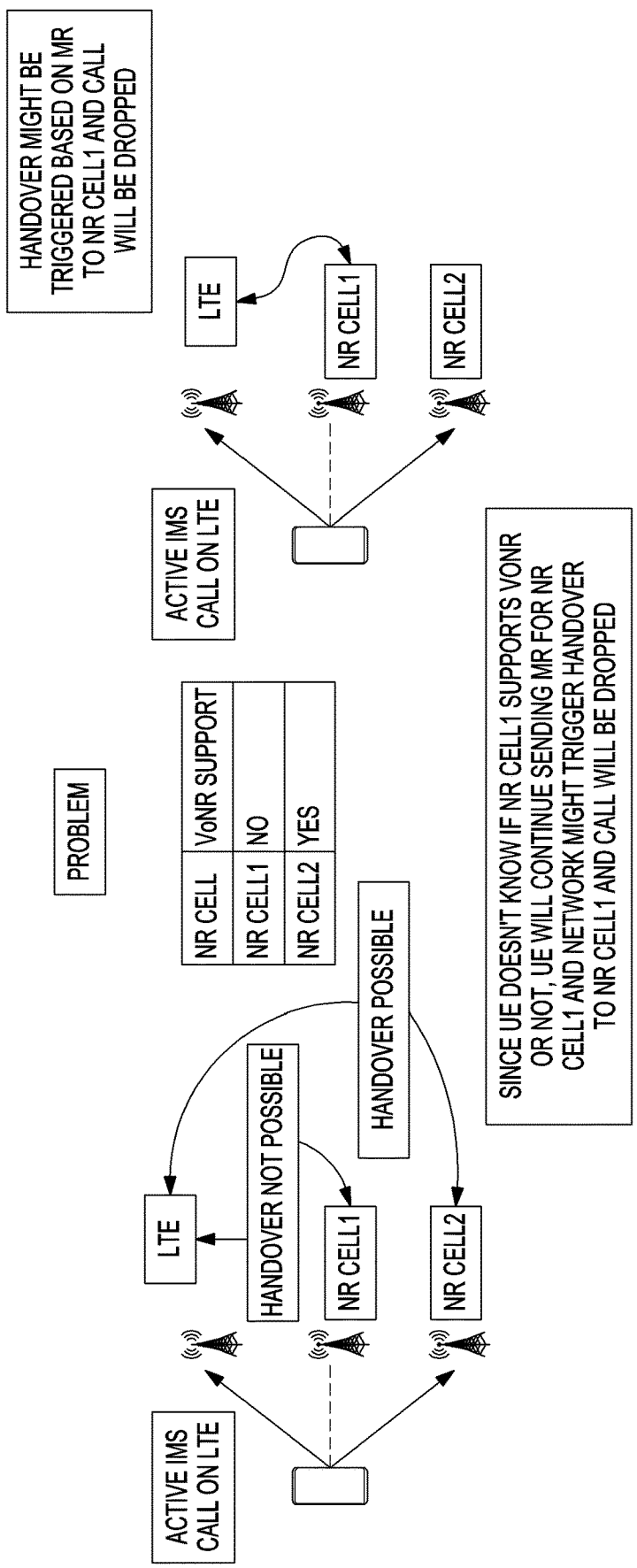
FIG. 14A is a schematic diagram, illustrating the call drop problem, according to the related art.
Figure 14B:
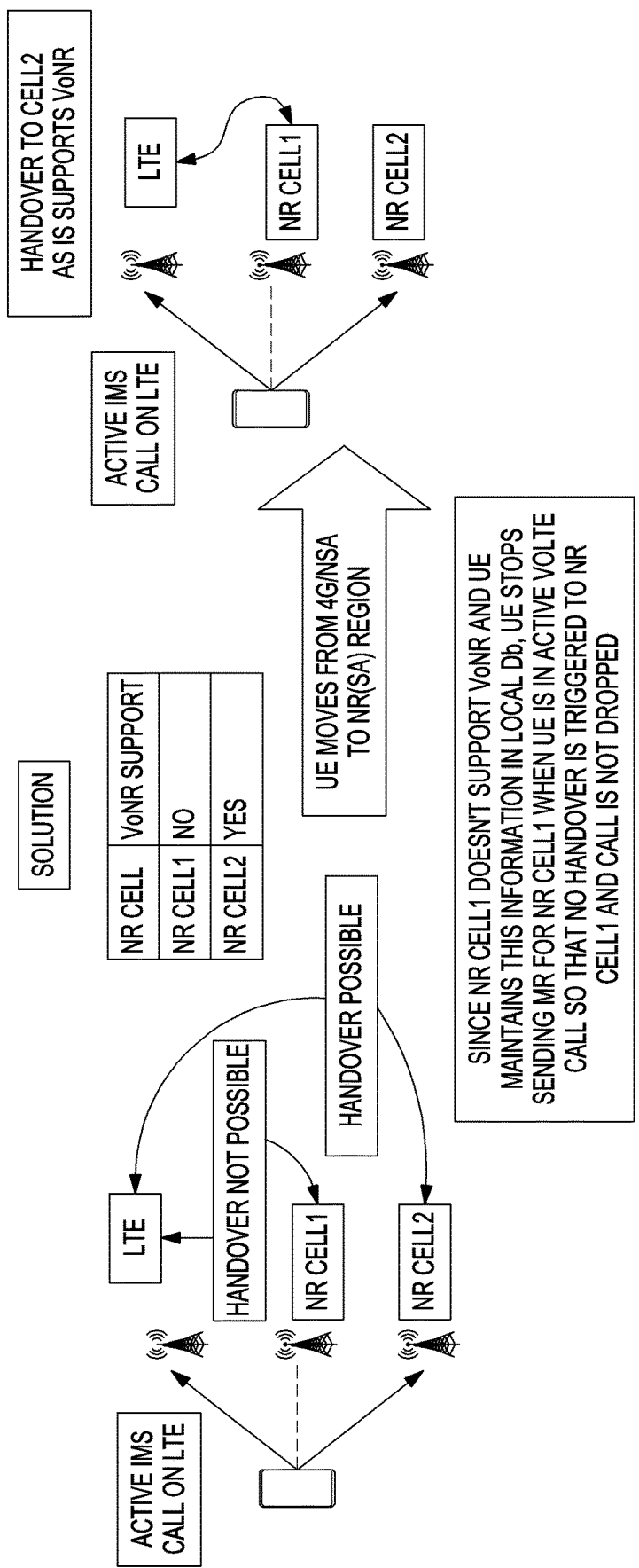
FIG. 14B is a schematic diagram, illustrating the proposed solution for avoiding call drop, according to an embodiment of the disclosure.

FIG. 14A is a schematic diagram, illustrating the call drop problem, according to the related art. FIG. 14B is a schematic diagram, illustrating the proposed solution for avoiding call drop, according to an embodiment of the disclosure.

Referring to FIG. 14A, since UE doesn't know if NR cell 1 supports VoNR or not, UE will continue sending MR for NR cell 1 and network might trigger handover to NR cell 1 and call will be dropped.

Referring to FIG. 14B, since NR cell 1 doesn't support VONR and UE maintains this information in local Db, UE stops sending MR for NR cell 1 when UE is in active Volte call so that no handover is triggered to NR cell 1 and call is not dropped.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of handling a voice over long term evolution (VOLTE) call performed by a user equipment (UE) in a wireless network, the method comprising:
   initiating the VOLTE call in a 4th generation (4G) network;
   receiving configuration information for an inter radio access technology (I-RAT) measurement relating to the 4G network and a 5G network;
   determining whether at least one of the UE or the 5G network does not support a voice over new radio (VoNR) call; and
   controlling not to transmit a B1 measurement report while the VOLTE call is ongoing in response to determining that the at least one of the UE or the 5G network does not support the VoNR call.

2. The method of claim 1,
   wherein the B1 measurement report relates to a handover of the UE from a 4G network area to a 5G network area.

3. The method of claim 1, wherein the controlling not to transmit the B1 measurement report comprises:
   determining that the UE does not support evolved universal mobile telecommunications system (UMTS) terrestrial radio access (E-UTRA) new radio dual connectivity (ENDC);
   controlling not to transmit the B1 measurement report; and
   transmitting a B1 measurement report in response to determining that the VOLTE call is disconnected.

4. The method of claim 1, further comprising:
   determining that the UE supports evolved universal mobile telecommunications system (UMTS) terrestrial radio access (E-UTRA) new radio dual connectivity (ENDC);
   transmitting the B1 measurement report;
   receiving an LTE to NR handover message; and
   continuing the VOLTE call in response to receiving the LTE to NR handover message.

5. The method of claim 1, wherein the controlling not to transmit the B1 measurement report comprises:
   determining that the UE supports evolved universal mobile telecommunications system (UMTS) terrestrial radio access (E-UTRA) new radio dual connectivity (ENDC) and does not support VoNR in a 5G stand alone (SA) mode;
   determining that a second cell group (SCG) associated with the 5G network is added;
   controlling to transmit an A2/A3/A4 measurement report and controlling not to transmitting the B1 measurement report;
   determining whether the VOLTE call is disconnected; and
   transmitting a B1 measurement report in response to determining that the VOLTE call is disconnected.

6. The method of claim 1, wherein the controlling not to transmit the B1 measurement report comprises:
   determining that the UE supports evolved universal mobile telecommunications system (UMTS) terrestrial radio access (E-UTRA) new radio dual connectivity (ENDC) and does not support VONR in a 5G stand alone (SA) mode;
   determining that a second cell group (SCG) associated with the 5G network is not added;
   transmitting the B1 measurement report;
   receiving an LTE to new radio (NR) handover message; and
   continuing the VOLTE call in response to receiving the LTE to NR handover message.

7. The method of claim 1, wherein the controlling not to transmit the B1 measurement report comprises:
   determining that the UE supports evolved universal mobile telecommunications system (UMTS) terrestrial radio access (E-UTRA) new radio dual connectivity (ENDC) and does not support VoNR in a 5G stand alone (SA) mode;
   determining that a second cell group (SCG) associated with the 5G network is not added;
   controlling not to transmit the B1 measurement report;
   determining whether the VOLTE call is disconnected; and
   transmitting a B1 measurement report in response to determining that the VOLTE call is disconnected.

8. The method of claim 1, wherein the controlling not to transmit the B1 measurement report comprises:
   determining that the UE supports evolved universal mobile telecommunications system (UMTS) terrestrial radio access (E-UTRA) new radio dual connectivity (ENDC) and does not support VONR over frequency range 2 (FR2);
   controlling not to transmit the B1 measurement report;
   determining whether the VOLTE call is disconnected; and
   transmitting a B1 measurement report in response to determining that the VOLTE call is disconnected.

9. The method of claim 1, wherein the controlling not to transmit the B1 measurement report comprises:
   determining that the UE supports evolved universal mobile telecommunications system (UMTS) terrestrial radio access (E-UTRA) new radio dual connectivity (ENDC) and does not support VoNR over frequency range 2 (FR2);
   transmitting the B1 measurement report;
   receiving an LTE to new radio (NR) handover message; and
   continuing the VOLTE call in response to receiving the LTE to NR handover message.

10. The method of claim 1, wherein the controlling not to transmit the B1 measurement report comprises:
    determining, that the UE supports a VoNR call;
    creating a database comprising a list of 5G cells supporting VONR;
    performing the I-RAT measurement;
    determining whether a 5G cell related to the I-RAT measurement is available in the database; and
    controlling not to transmit the B1 measurement report in response to determining that 5G cell is not available in the database.

11. A user equipment (UE) for handling a voice over long term evolution (VOLTE) call in a wireless network, the UE comprising:
    memory, comprising one or more storage media, storing instructions; and
    at least one processor communicatively coupled to the memory,
    wherein the instructions, when executed by the at least one processor individually or collectively, cause the UE to:

initiate the VOLTE call in a 4th generation (4G) network, receive configuration information for an inter radio access technology (I-RAT) measurement indicating relating to the 4G network and a 5G network, determine whether at least one of the UE or the 5G network does not support a voice over new radio (VoNR) call; and control not to transmit a B1 measurement report while the VOLTE call is ongoing in response to determining that the at least one of the UE or the 5G network does not support the VoNR call.

12. The UE of claim 11, wherein the B1 measurement report relates to a handover of the UE from a 4G network area to a 5G network area.

13. The UE of claim 11, wherein the instructions, when executed the at least one processor individually or collectively, to control not to transmit the B1 measurement report, further cause the UE to:

determine that the UE does not support evolved universal mobile telecommunications system (UMTS) terrestrial radio access (E-UTRA) new radio dual connectivity (ENDC), control not to transmit the B1 measurement report, and transmit a B1 measurement report in response to determining that the VOLTE call is disconnected.

14. The UE of claim 11, wherein the instructions, when executed the at least one processor individually or collectively, to control not to transmit the B1 measurement report, further cause the UE to:

determine that the UE supports evolved universal mobile telecommunications system (UMTS) terrestrial radio access (E-UTRA) new radio dual connectivity (ENDC), transmit the B1 measurement report, receive an LTE to NR handover message, and continue the VOLTE call in response to receiving the LTE to NR handover message.

15. The UE of claim 11, wherein the instructions, when executed the at least one processor individually or collectively, to control not to transmit the B1 measurement report, further cause the UE to:

determine that the UE supports evolved universal mobile telecommunications system (UMTS) terrestrial radio access (E-UTRA) new radio dual connectivity (ENDC) and does not support VoNR in a 5G stand alone (SA) mode, determine that a second cell group (SCG) associated with the 5G network is added, control to transmit an A2/A3/A4 measurement report and control not to transmit the B1 measurement report, determine whether the VOLTE call is disconnected, and transmit a B1 measurement reports in response to determining that the VOLTE call is disconnected.

16. The UE of claim 11, wherein the instructions, when executed the at least one processor individually or collectively, to control not to transmit the B1 measurement report, further cause the UE to:

determine that the UE supports evolved universal mobile telecommunications system (UMTS) terrestrial radio access (E-UTRA) new radio dual connectivity (ENDC) and does not support VONR in a 5G stand alone (SA) mode, determine that a second cell group (SCG) associated with the 5G network is not added, transmit the B1 measurement report, receive an LTE to new radio (NR) handover message, and continue the VOLTE call in response to receiving the LTE to NR handover message.

17. The UE of claim 11, wherein the instructions, when executed the at least one processor individually or collectively, to control not to transmit the B1 measurement report, further cause the UE to:

determine that the UE supports evolved universal mobile telecommunications system (UMTS) terrestrial radio access (E-UTRA) new radio dual connectivity (ENDC) and does not support VoNR in a 5G stand alone (SA) mode, determine that a second cell group (SCG) associated with the 5G network is not added, control not to transmit the B1 measurement report, determine whether the VOLTE call is disconnected, and transmit a B1 measurement report in response to determining that the VOLTE call is disconnected.

18. The UE of claim 11, wherein the instructions, when executed the at least one processor individually or collectively, to control not to transmit the B1 measurement report, further cause the UE to:

determine that the UE supports evolved universal mobile telecommunications system (UMTS) terrestrial radio access (E-UTRA) new radio dual connectivity (ENDC) and does not support VONR over frequency range 2 (FR2), control not to transmit the B1 measurement report, determining whether the VOLTE call is disconnected, and transmit a B1 measurement report in response to determining that the VOLTE call is disconnected.

19. The UE of claim 11, wherein the instructions, when executed the at least one processor individually or collectively, to control not to transmit the B1 measurement report, further cause the UE to:

determine that the UE supports evolved universal mobile telecommunications system (UMTS) terrestrial radio access (E-UTRA) new radio dual connectivity (ENDC) and does not support VoNR over frequency range 2 (FR2), transmit the B1 measurement report, receive an LTE to new radio (NR) handover message, and continue the VOLTE call in response to receiving the LTE to NR handover message.

20. The UE of claim 11, wherein the instructions, when executed the at least one processor individually or collectively, to control not to transmit the B1 measurement report, further cause the UE to:

determine, that the UE supports a VoNR call, create a database comprising a list of 5G cells supporting VONR, perform the I-RAT measurement, determine whether a 5G cell related to the I-RAT measurement is available in the database, and control not to transmit the B1 measurement report in response to determining that 5G cell is not available in the database.

* * * * *